(12) United States Patent
Kawaguchi

(10) Patent No.: US 10,168,970 B2
(45) Date of Patent: Jan. 1, 2019

(54) PRINT LAYOUT GENERATING DEVICE, AND NON-TRANSITORY STORAGE MEDIUM STORING COMPUTER-READABLE INSTRUCTIONS TO GENERATE PRINT LAYOUT

(71) Applicant: Brother Kogyo Kabushiki Kaisha, Nagoya-shi, Aichi-ken (JP)

(72) Inventor: Masafumi Kawaguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/461,540

(22) Filed: Mar. 17, 2017

(65) Prior Publication Data

US 2017/0371605 A1    Dec. 28, 2017

(30) Foreign Application Priority Data

Jun. 22, 2016 (JP) ................ 2016-123964

(51) Int. Cl.
*G06K 15/02* (2006.01)
*G06F 3/12* (2006.01)

(52) U.S. Cl.
CPC .......... *G06F 3/1256* (2013.01); *G06F 3/1204* (2013.01); *G06F 3/1208* (2013.01); *G06F 3/1243* (2013.01); *G06F 3/1251* (2013.01); *G06F 3/1284* (2013.01)

(58) Field of Classification Search
None
See application file for complete search history.

(56) References Cited

U.S. PATENT DOCUMENTS

| 2006/0066905 A1* | 3/2006 | Takashima ............ G06F 17/211 358/1.18 |
| 2010/0328692 A1* | 12/2010 | Morooka ............... G06F 17/211 358/1.9 |
| 2012/0151332 A1* | 6/2012 | Kaneko ................. G06F 3/1208 715/253 |

FOREIGN PATENT DOCUMENTS

| JP | 2007-249431 A | 9/2007 |
| JP | 2014-099069 A | 5/2014 |

* cited by examiner

*Primary Examiner* — Henok A Shiferaw
(74) *Attorney, Agent, or Firm* — Banner & Witcoff, Ltd.

(57) ABSTRACT

A non-transitory storage medium storing computer-readable instructions which cause, when executed by a controller, cause the print layout generating device to display a first image indicative of a layout area in which objects can be arranged, display a second image indicative of a database including at least one field, and at least one record for the at least one field, the at least one record containing character data corresponding to each of at least one field, receive a first operation to select at least one field, receive a second operation to select a position within the layout area, identify a position of the selected object within the layout area, generating print layout data in which the selected object and a selected field are associated with each other. Selected characters corresponding to the selected field of the database are arranged within the selected objects for each record of the database.

20 Claims, 14 Drawing Sheets

PRINT LAYOUT GENERATING DEVICE, AND NON-TRANSITORY STORAGE MEDIUM STORING COMPUTER-READABLE INSTRUCTIONS TO GENERATE PRINT LAYOUT

CROSS-REFERENCE TO RELATED APPLICATIONS

This application claims priority under 35 U.S.C. § 119 from Japanese Patent Application No. 2016-123964 filed on Jun. 22, 2016. The entire subject matter of the application is incorporated herein by reference.

BACKGROUND

Technical Field

The present disclosures relate to a print layout generating device and a non-transitory computer-readable storage medium storing instructions which cause, when executed by a controller, the print layout generating device to generate a print layout.

Related Art

There has been known a layout printing process in which data corresponding to a plurality of fields of a database are arranged within a plurality of objects, respectively, and the thus arranged data is printed on a record basis. There has also been known a technique to generate a print layout, in which technique arrangement and size of a plurality of objects, and fields of the database to be associated with respective objects are designated. For example, according to a certain conventional technique, an information processing device is configured to generate a template (hereinafter, "template" will be referred to as a "print layout"). The print layout is typically generated in accordance with an input operation through a user interface such that objects are arranged on a document, the size and position of each object are adjusted, and fields are associated with respective objects.

SUMMARY

When the print layout is generated with the information processing device described, user operations corresponding to multiple processes (e.g., arrangement of the objects, adjustment of positions and sizes of respective objects, and association of fields with respective objects). Such operations are troublesome, and there has been a demand to generate the print layout easily with less operation processes.

According to aspects of the disclosure, there is provided a non-transitory storage medium storing computer-readable instructions to generate print layout data. The instructions cause, when executed by a controller of a print layout generating device, cause the print layout generating device to display a first image indicative of a layout area in which objects can be arranged, each of the objects indicating an area within which characters are arranged, display a second image indicative of a database including at least one field, and at least one record for the at least one field, the at least one record containing character data corresponding to each of at least one field, receive a first operation to select at least one field based on the second image, receive a second operation to select a position within the layout area based on the first image, identify a position of the selected object within the layout area in response to reception of the second operation, generating the print layout data in which the selected object of which position is identified and a selected field which is at least one field selected from the database by the first operation are associated with each other. Selected characters corresponding to the selected field of the database are arranged within the selected objects for each record of the database.

According to aspects of the disclosures, there is provided a print layout generating device configured to generate print layout data. The print layout generating device includes a display device, and a controller. The controller is configured to display a first image on the display device, the first image being indicative of a layout area in which objects can be arranged, each of the objects indicating an area within which characters are arranged, display a second image on the display device, the second image being indicative of a database including at least one field, and at least one record for the at least one field, the at least one record containing character data corresponding to each of at least one field, receive a first operation to select at least one field based on the second image through the input device, receive a second operation to select a position within the layout area based on the first image through the input device, identify a position of the selected object within the layout area in response to reception of the second operation, generating the print layout data in which the selected object of which position is identified and a selected field which is at least one field selected from the database by the first operation are associated with each other. Further, selected characters corresponding to the selected field of the database are arranged within the selected objects for each record of the database.

BRIEF DESCRIPTION OF THE ACCOMPANYING DRAWINGS

FIG. 1 schematically shows a configuration of a printing system according to an illustrative embodiment of the disclosures.

FIG. 2 schematically shows an example of an arrangement table according to the illustrative embodiment.

DETAILED DESCRIPTION OF THE EMBODIMENTS

<General Description on Printing System>

Figure 1:
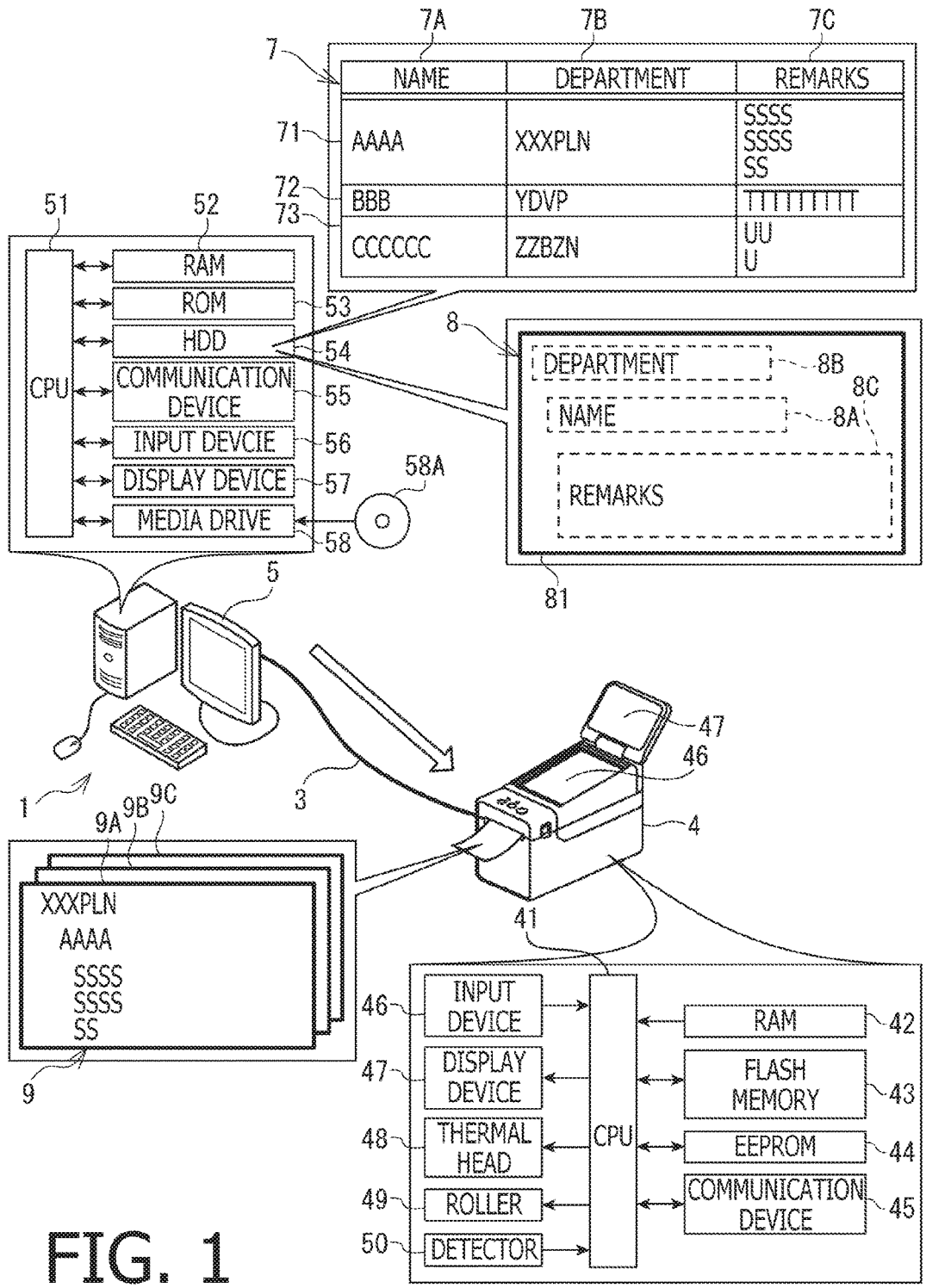

Hereinafter, referring to the accompanying drawings, a printing system 1 according to an illustrative embodiment will be described. The printing system 1 includes a printer 4, and a PC (personal computer) 5. The printer 4 is a tape printer. Specifically, the printer 4 is configured to feed a tape from a tape roll attached to the printer 4, and execute printing by forming multiple dots on the fed part of the tape. The printer 4 and the PC are connected with a cable 3, and communicate with each other through the cable 3.

The PC 5 is configured to transmit a print layout file (described later), which is generated in accordance with a user operation, and a database file (described later) to the printer 4 through the cable 3. The printer 4 executes a layout printing process (described later) based on the layout file and the database file received from the PC 5.

An electrical configuration of the printer 4 will be described. The printer 4 has a CPU (central processing unit) 41, a RAM (random access memory) 42, a flash memory 43, an EEPROM (electrically erasable programmable read only memory) 44, a communication device 45, an input device 46, a display device 47, a thermal head 48, a roller 49 and a detector 50. The CPU 41 controls operations of the printer 4. The CPU 41 is electrically connected with the RAM 42, the flash memory 43, the EEPROM 44, the communication device 45, the roller 49 and the detector 50. The RAM 42 is configured to store various types of temporary data.

The flash memory 43 is configured to store programs to control the printer 43. Further, the flash memory 43 is also configured to store the print layout file and the database file, which are received from the PC 5. The EEPROM 44 is configured to store printing dot pattern data categorized by font and size. The printing dot pattern data is referred to when various characters are printed. The communication device 45 is a controller realizing a communication with the PC 5. The input device 46 includes a touch panel. The display device 47 includes an LCD (liquid crystal display). The thermal head 48 generates heat in accordance with a signal from the CPU 41 and apply the heat to perform printing on the tape. The roller 49 is a tape feeding roller. The detector 50 is configured to detect a type of the tape roll attached to the printer 4. The CPU 41 is configured to identify a width of the tape and a type of the tape (e.g., a fixed length tape, or a non-fixed length tape) based on the detected type of the tape roll.

An electrical configuration of the PC 5 will be described. The PC 5 has a CPU 51, a RAM 52, a ROM (read only memory) 53, an HDD (hard disk drive) 54, a communication device 55, an input device 56, a display device 57 and a media drive 58. The CPU 51 is configured to control operations of the PC 5. The CPU 51 is electrically connected with the RAM 52, the ROM 53, the HDD 54, the communication device 55, the input device 56, the display device 57 and the media drive 58.

The RAM 52 is configured to store temporary data. The ROM 53 is configured to store BIOS (basic input/output system) and the like. The HDD 54 is configured to store programs which are to be executed by the CPU 51 to control the PC 5, and an OS (operating system). Further, the HDD 54 is configured to store a plurality of database files, print layout files, tape information, and an arrangement table 6 (see FIG. 2). The communication device 55 is a controller for realizing communication with the printer 4. The input device 56 includes a keyboard and a mouse. The display device 57 is an LCD. The media drive 58 is configured to retrieve information stored in a computer-readable recording medium 58A such as a semiconductor memory, an optical disc and the like. The CPU 51 is configured to retrieve programs stored in the recording medium 58A with use of the media drive 58 and store the same in the HDD 54.

<Database File>

A database file 7 stored in the HDD 54 of the PC 5 will be described. The database file 7 is configured to include at least one field (i.e., one or more fields) and at least one record. Each of the at least one record is configured as a collection of one or more pieces of character data respectively corresponding to the one or more fields. In the following description, the character data representing the characters will be simply referred to as characters.

In an example shown in FIG. 1, the database file 7 has three fields 7A, 7B and 7C, which respectively have field names "NAME", "DEPARTMENT" and "REMARKS". Further, the database file 7 has three records 71, 72 and 73. The record 71 contains characters "AAAA" for the "NAME" field, "XXXPLN" for the "DEPARTMENT" field, and "SSSS(feed code)SSSS(feed code)SS" for the "REMARKS" field. Similarly, the record 72 contains characters "BBB" for the "NAME" field, "YDVP" for the "DEPARTMENT" field, and "TTTTTTTT" for the "REMARKS" field, and the record 73 contains characters "BBB" for the "NAME" field, "ZZBZN" for the "DEPARTMENT" field, and "UU(feed code)U" for the "REMARKS" field. According to the illustrative embodiment, the characters "XXXPLN" means "XXX PLANNING DEPARTMENT", the characters "YDVP" means "Y DEVELPOMENT DEPARTMENT" and the characters "ZZBZN" means "ZZ BUSINESS DEPARTMENT".

It is noted that each field of each record may include multiple lines of characters including feed codes "SSSS(feed code)SSSS(feed code)SS" (field 7C of record 71) or "UU (feed code)U" (field 7C of record 73). It is also noted that only one database file 7 is shown in FIG. 1, more than one database files may be stored in the HDD 54.

It is noted that, in the illustrative embodiment, the characters included in each of the records 71, 72 and 73 of the database file 7 are indicated as so-called two-byte characters. It should be noted that one-byte characters may be included in the database file 7. Further, only one-byte characters may be used in the database file 7. Furthermore, the characters may be indicated with either a proportional-pitch font or a fixed-pitch font.

<Print Layout File>

Next, a print layout file 8, which is generated in a main process (see FIGS. 3-5), will be described. In the print layout file 8, at least one object is defined. Each object is defined as a rectangular area arranged within a particular area (hereinafter, referred to as a "layout area"). The layout area corresponds to a print area of the printer 4, and the print area is defined as an area subject to the layout printing. In the print layout file, a position and a size (i.e., a width and a height) of each object are defined, and the fields of the database file 7 are associated with the objects, respectively.

For example, in the print layout file 8 shown in FIG. 1, objects 8A, 8B and 8C are arranged within a layout area 81, and the position and the size of each of the objects 8A, 8B and 8C are identified. Further, the objects 8A, 8B and 8C are associated with the fields 7A (NAME), 7B (DEPARTMENT) and 7C (REMARKS) of the database file 7, respectively.

<Layout Printing Process>

When the print layout file 8 and the database file 7 are received from the PC 5 through the cable 3, the printer 4 executes the layout printing process. The layout printing process is a printing method in which characters of respective fields are arranged within corresponding objects defined in the print layout file 8, and printed on the tape on a record basis. As described above, each object of the print layout file 8 are associated with the corresponding field of the database file 7. Thus, in each object, characters corresponding to the field associated with the object are arranged. When the database file includes a plurality of records, an operation to arrange the characters at corresponding objects and print the same is repeated for each of the plurality of records.

As an example, a case where the database file 7 and the print layout file 8 are transmitted from the PC 5 to the printer 4, as shown in FIG. 1, will be described. In such a case, the printer 4 executes the layout printing process based on the database file 7 and the print layout file 8 received from the PC 5 to generate a label 9. Specifically, an image, which is configured such that the characters "XXXPLN" of field 7B are arranged within the object 8B, the characters "AAAA" are arrange within the object 8A, and the characters "SSSS (feed code)SSSS(feed code)SS" of field 7C are arranged within the object 8C based on the record 71 of the database file 7, is printed on the tape, thereby a label 9A being generated. Based on the records 72 and 73 of the database file 7, the similar process (i.e., the layout printing process) is repeated and labels 9B and 9C are generated, respectively.

<Arrangement Table>

Figure 2:
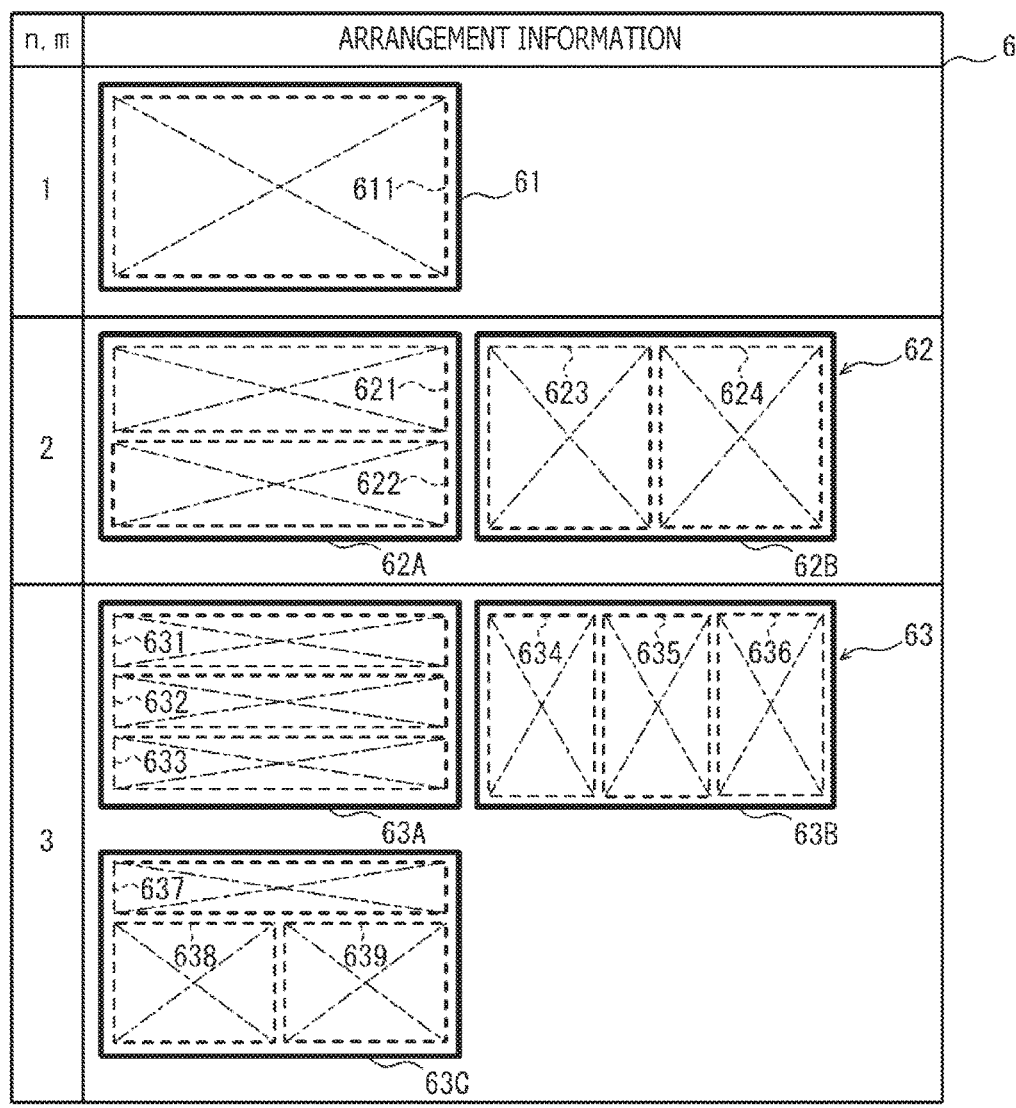

Referring to FIG. 2, the arrangement table 6 will be described. The arrangement table 6 includes arrangement information indicating arrangement of the objects which are arranged within the layout area, based on variable (n, m). It is noted that both n and m represent a total number of selected fields. Specifically, n represents the number when multiple fields are selected one by one, while m represents the number when multiple fields are selected simultaneously. The indication (n, m) in FIG. 6 means one of the variable n and m. The arrangement table 6 includes arrangement information 61 when the variable (n, m) is "1", arrangement information 62A and 62B (hereinafter, occasionally referred to as arrangement information 62 collectively) when the variable (n, m) is "2", and arrangement information 63A, 63B and 63C (hereinafter, occasionally be referred to as arrangement information 63 collectively) when the variable (n, m) is "3".

Each piece of arrangement information can identify the size (i.e., width and height) of the rectangular area, and the position of the center of each rectangular area. The position of the center of a rectangular area corresponds to an intersection of two diagonal lines of the rectangular area. It is noted that the positions of the centers of the multiple areas included in each of the arrangement information 62 and 63 are adjusted so that the multiple areas do not overlap each other.

Specifically, the arrangement information 61 can identify an area 611. The area 611 is arranged over an entire area of the layout area. That is, the area 611 indicates an area the same as the layout area.

The arrangement information 62A can identify areas 621 and 622. The area 621 indicates an upper half area of the layout area, while the area 622 indicates a lower half area of the layout area. The arrangement information 62B can identify areas 623 and 624. The area 623 is a left half of the layout area, while the area 64 is a right half of the layout area.

The arrangement information 63A can identify areas 631, 632 and 633. The areas 631-633 are three equal parts of the layout area trisected in the up-down direction, respectively. The areas 631, 632 and 633 are arranged from an upper side to a lower side in this order.

The arrangement information 63B can identify areas 634, 635 and 636. The areas 634-636 are three equal parts of the layout area trisected in the right-left direction, respectively. The areas 634, 635 and 636 are arranged from a left side to a right side in this order.

The arrangement information 63C can identify areas 637, 638 and 639. The area 637 is substantially an upper half part of the layout area. The area 638 is a left half of substantially a lower half part of the layout area. The area 639 is a right half of substantially the lower half part of the layout area.

The CPU 51 validates the arrangement information 61 (n, m=1), 62 (n, m=2) and 63 (n, m=3) in its default state. It is noted that the valid (i.e., validated) arrangement information can be modified by the user. In the main process (FIGS. 3-5), the CPU 51 may determine positions of the objects in the layout area based on the valid arrangement information.

<Main Process>

Figure 3:
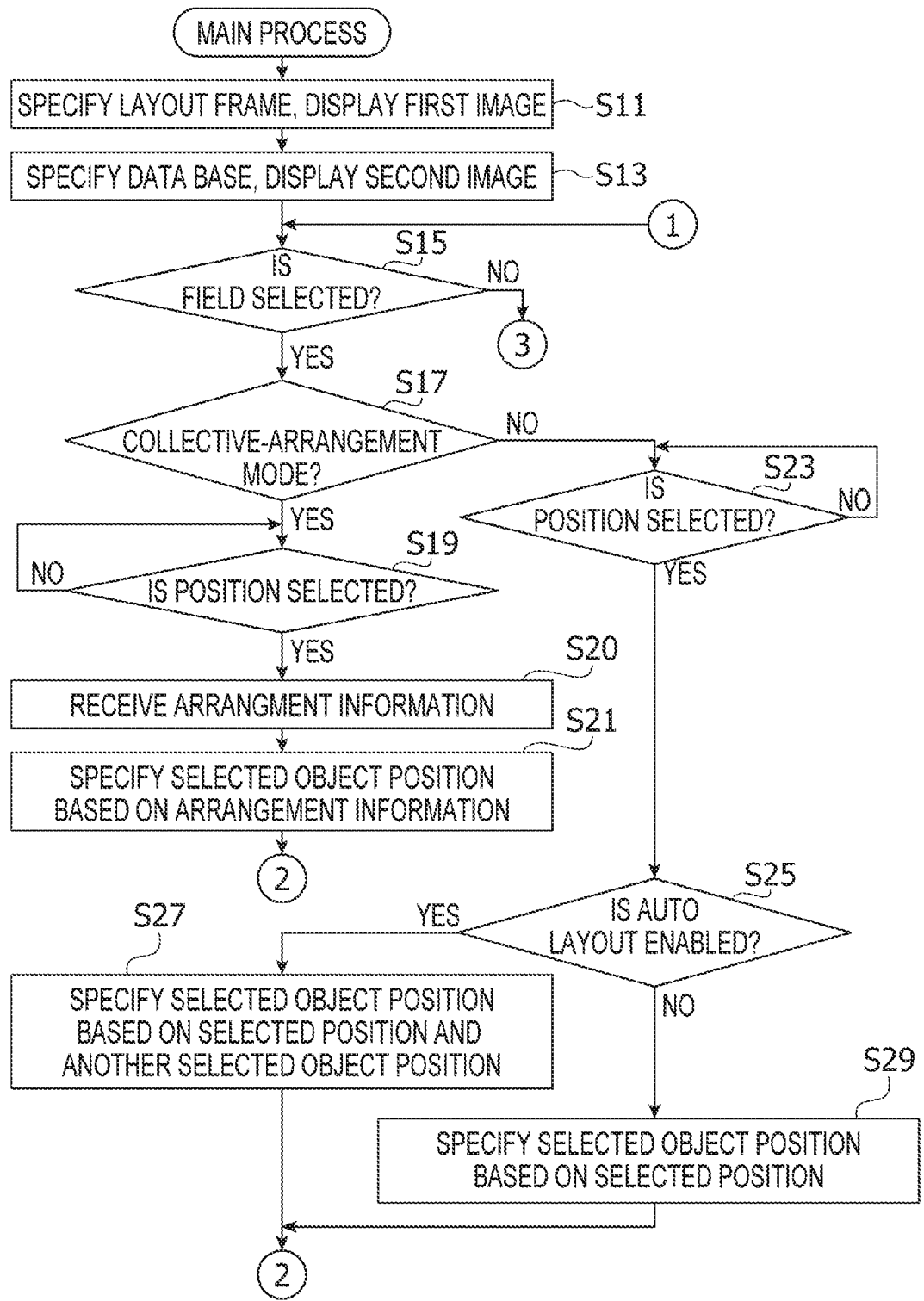
FIGS. 3-5 show a flowchart illustrating a main process according to the illustrative embodiment of the disclosures.
Figure 4:
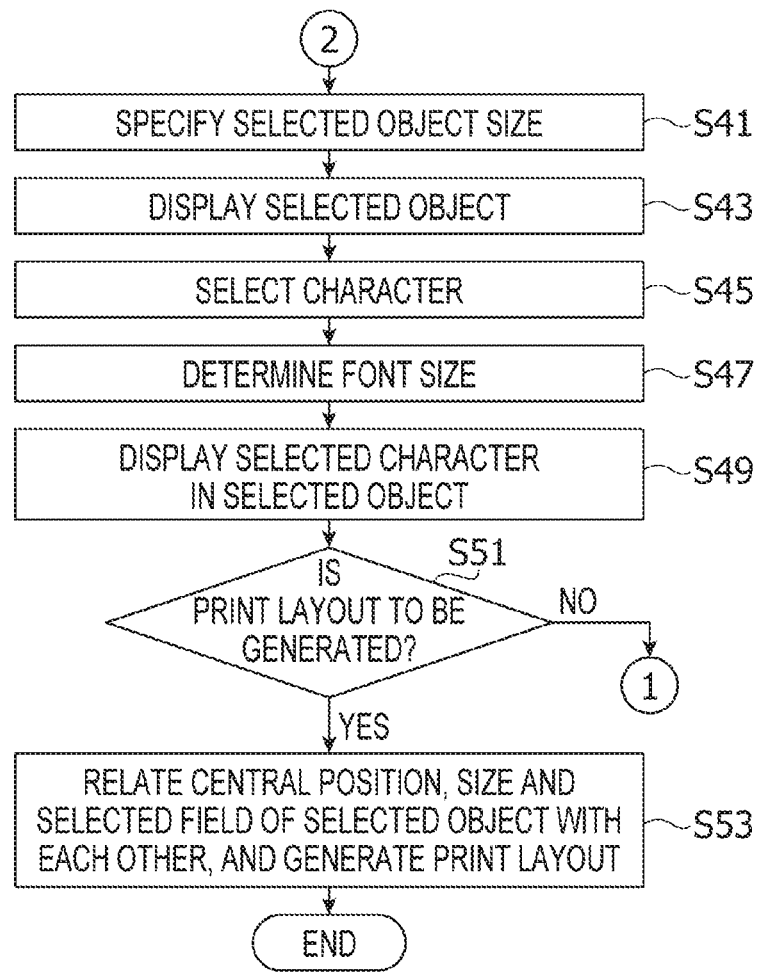
Figure 5:
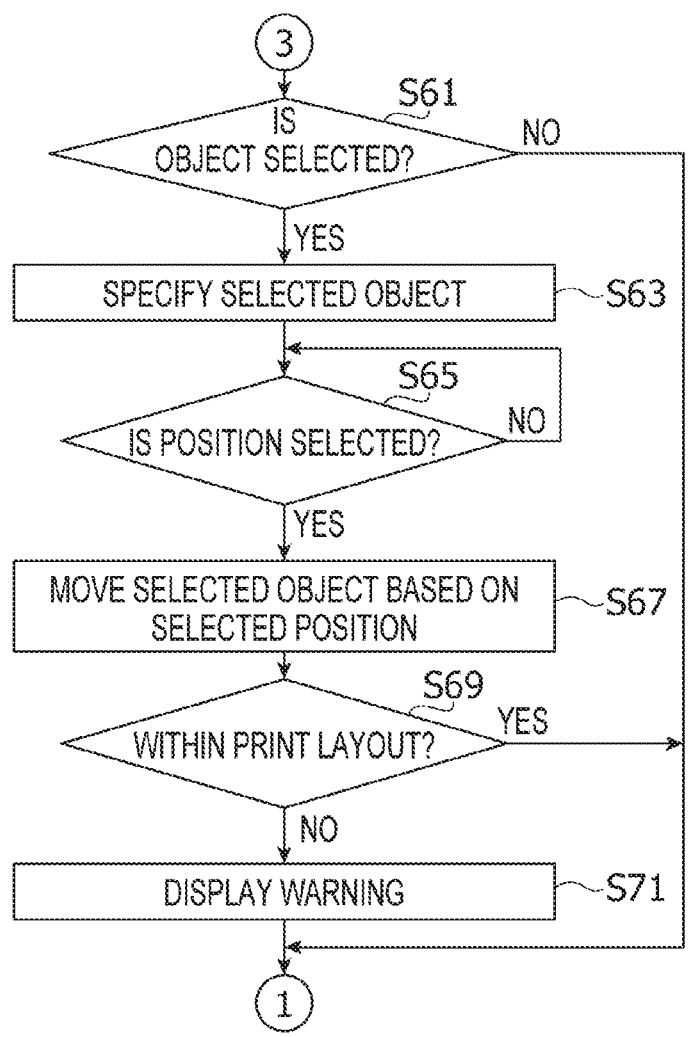

When an operation to start generating the print layout file through the input device 56, the CPU 51 executes a program stored in the HDD 54 to start the main process (see FIGS. 3-5).

Initially, the CPU 51 displays a title bar and the like of a generating window 57A on the display device 57 (see FIG. 1). The generating window 57A is used when the user generates the print layout file 8. Next, the CPU 51 displays setting sections 57B, 57C and 57D within the generating window 57A.

The setting section 57B enables the user to input a setting regarding the font size. Specifically, the setting section 57B includes input windows in which a range of the font size (i.e., a minimum font size and a maximum font size) can be input, and selection buttons enabling the user to select "FIXED" or "VARIABLE" as a font size setting.

The setting section 57C enables the user to set a preview mode when a preview image is displayed. Specifically, the setting section 57C includes buttons enabling the user to select one of "MAX W" (i.e., maximum width), "MIN W" (i.e., minimum width), "MAX H" (i.e., maximum height) and "MIN H" (i.e., minimum height) as a setting of the preview mode.

The setting section 57D enables the user to set ON/OFF (i.e., enabled state/disabled state) of the auto layout setting when laying-out of the objects is executed. Specifically, the setting section 57D includes buttons to enable the user to select one of "ON" (enabled) and "OFF" (disabled).

Figure 6:
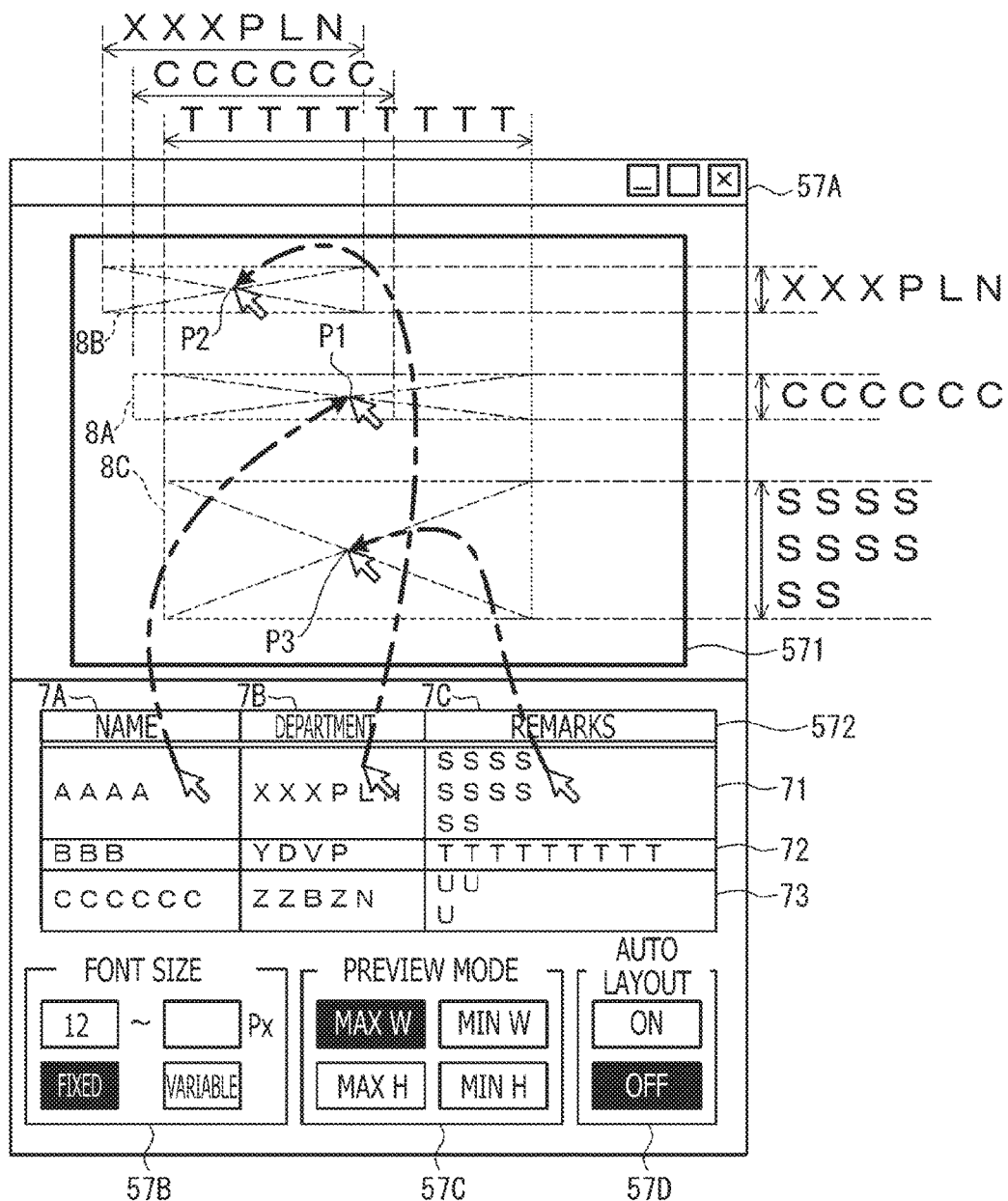
FIG. 6 shows a case where a dragging operation and a dropping operation are performed.

The CPU 51 retrieves tape information stored in the HDD 54. The tape information indicates the type of the roll attached to the printer 4 which is connected, through the cable 3, to the PC 5. The tape information has been input to the PC 5 in advance through the input device 56. Based on the retrieved tape information, the CPU 51 identifies the width of the tape and the type (i.e., fixed length/variable length) of the tape. The CPU 51 then identifies a layout frame corresponding to the width the type of the tape as identified. The layout frame has a rectangular shape. It is noted that an area surrounded by the layout frame corresponds to the layout area. As shown in FIG. 6, the CPU 51 displays a first image 571 representing the layout frame as identified on an upper side of the generating window 57A (see S11 of FIG. 3).

The CPU detects an operation to select an item of the database file 7 stored in the HDD 54 through the input device 56. Then, in accordance with the detected operation, the CPU 51 identifies the database file 7. Next, the CPU 51 displays a second image 572 indicating the identified database file below the first image 571 (see FIG. 6) within the generating window 57A (S13 of FIG. 3). In the following description, it is assumed that the second image 572 corresponding to the database file 7 (see FIG. 1) is displayed on the display device 57 as shown in FIG. 6.

As shown in FIG. 4, the CPU 51 determines whether at least one field in the second image 572 is selected by a dragging operation through the input device 46 (S15). It is noted that there are cases where the number of the selected fields is one and more than one. It is noted that when a plurality of fields are selected simultaneously by a dragging operation, for example, an area, within the second image 572, including a plurality of fields is selected with the mouse, a click button of the mouse may be depressed with a mouse pointer being located within the selected area, and the mouse (i.e., the mouse pointer) is moved with the click button being depressed. When the CPU 51 determines that at least one field of the second image 572 is selected (S15: YES), the CPU 51 forwards the process to S17. In the following description, the at least one field selected by the dragging operation will be referred to as the "selected field".

The CPU 51 determines whether multiple fields are simultaneously selected as the selected fields by the dragging operation (S17). When it is determined that one field is selected as the selected field, the CPU 51 determines that an individual arrangement mode is selected (S17: NO). In this case, the CPU 51 forward the process to S23.

In S23, the CPU 51 determines whether anyone of the positions within the layout area indicated by the first image 571 is selected by a dropping operation through the input device 46. When it is determined that no dropping operation is detected (i.e., no position is selected) (S23: NO), the CPU 51 forwards the process to S23 and repeats S23. When it is determined that anyone of the positions within the layout area is selected by the dropping operation (S23: YES), the CPU 51 forwards the process to S25.

The CPU 51 determines whether the auto layout is enabled (S25). When the "OFF" button of the setting section 57D (see FIG. 6) is depressed, the CPU 51 determines that the auto layout is disabled (S25: NO). In this case, the CPU 51 identifies a position, within the layout area indicated by the first image 571, selected by the dropping operation as the center of an object corresponding to the selected field subjected to the dropping operation (S29). In the following description, an object corresponding to the selected field will be referred to as a "selected object". Thereafter, the CPU 51 forwards the process to S41 (see FIG. 4).

Referring to FIG. 6, a process in S29 will be described in detail. In the following description, it is assumed that the field 7A is selected by the dragging operation from among the fields 7A-7C of the databased file 7 shown in the second image 572 (S17: NO), and a position P1 within the layout area shown in the first image 571 is selected with the dropping operation (S23: YES). In this case, the CPU 51 identifies an intersection of two diagonal lines of the selected object 8A as the central position P1 of the selected object 8A (S29). According to similar methods, the CPU 51 determines a central position P2 of a selected object 8B, and a central position P3 of a selected object 8C (S29). It is noted that the sizes of the selected objects 8A-8C are unknown at this stage.

As shown in FIG. 4, the CPU 51 identifies the size (i.e., width and height) of the selected objects of which position is identified in S29 (see FIG. 3) based on the font size setting through the setting section 57B (S41).

Hereinafter, a method of identifying the sizes of the selected objects 8A-8C when, in the setting section 57B, "12px" is set as the minimum font size and "FIXED" font size is set will be described. In this case, the CPU 51 extracts all characters (hereinafter, referred to as selected characters) corresponding to the selected fields from among characters included in the records 71-73 of the databased file 7 indicated by the second image 572.

Next, the CPU 51 further extracts the selected characters of which width would be the greatest when the selected characters would be printed at the minimum font size "12px" set in the setting section 57B. Then, the CPU 51 sets the width of the extracted selected characters when printed at the minimum font size as the width of the extracted selected characters. Similarly, the CPU 51 extracts the selected characters of which height would be the highest when the selected characters would be printed at the minimum font size "12px" set in the setting section 57B. Then, the CPU 51 sets the height of the extracted selected characters when printed at the minimum font size as the height of the extracted selected characters. With the above process, the size (i.e., width and height) of the selected objects can be identified.

Hereinafter, a method of identifying the size of the selected objects 8C when the field 7C (REMARKS) is selected as the selection field will be described. In this case, firstly, characters corresponding to the field 7C, which are "SSSS(feed code)SSSS(feed code)SS", "TTTTTTTTT" and "UU(feed code)U", are extracted as the selected characters. In FIG. 6, the characters included in the database file 7 are illustrated as two-byte characters. In such a case, the characters "TTTTTTTTT" which includes the greatest number of characters in the width direction has the greatest width when the characters would be printed with the minimum font size "12px". Thus, the CPU 51 identifies the width of "TTTTTTTTT" at the minimum font size of "12px" as the width of the selected objects 8C. Further, the characters "SSSS(feed code)SSSS(feed code)SS" has the greatest number of characters in the height direction. Therefore, the CPU 51 identifies the height of the characters "SSSS(feed code) SSSS(feed code)SS" when they would be printed at the minimum font size "12px" as the height of the selected objects 80. It is noted that a detail description on identification of the size of the selected objects 8A and 8B will be omitted.

Figure 7:
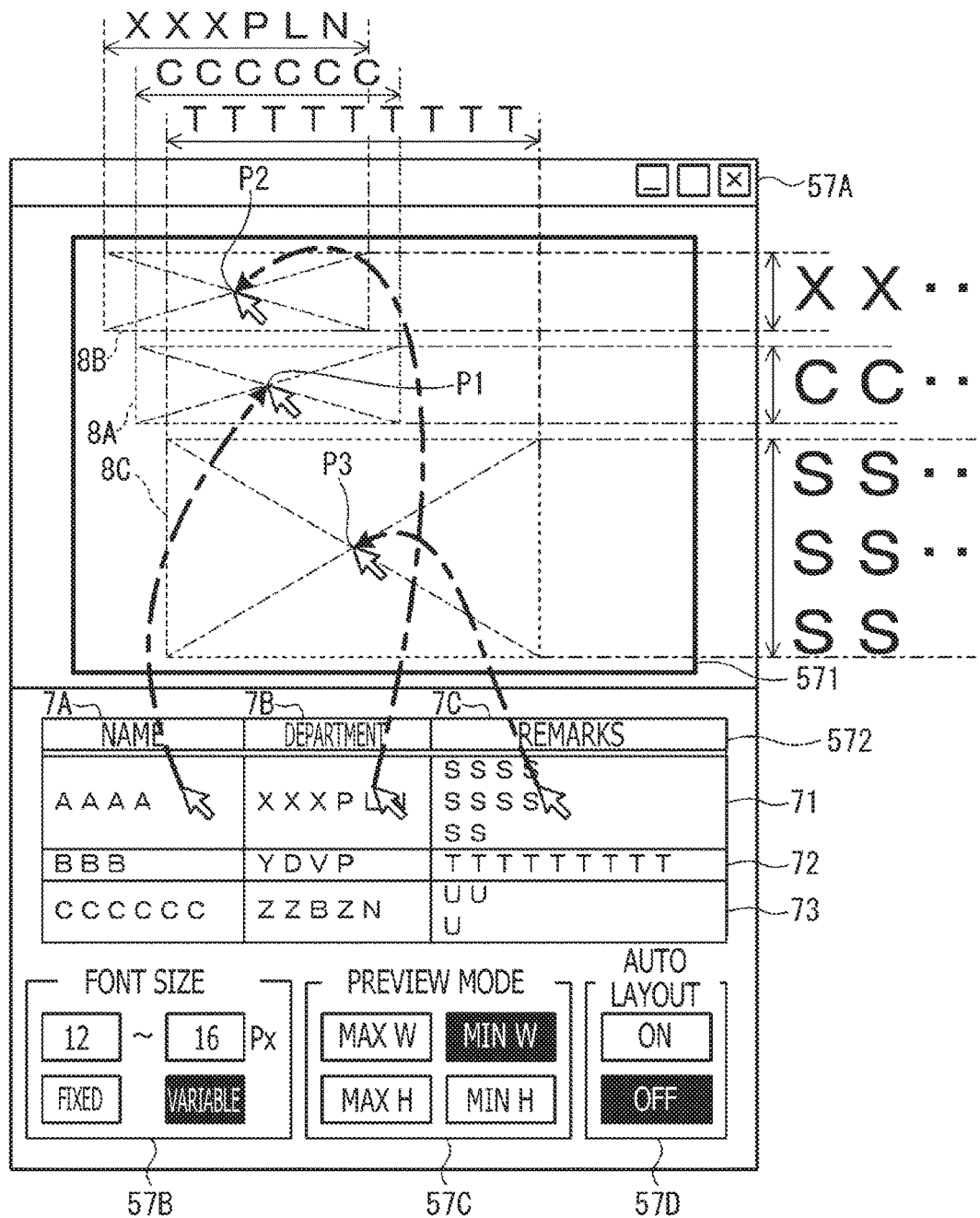
FIG. 7 shows a case where a dragging operation and a dropping operation are performed.

Next, a method of identifying the sizes of the selected objects 8A-8C when the minimum font size is set to "12px", the maximum font size is set to "16px" and the font size is set to be variable as shown in FIG. 7 will be described. In such a case, the method of identifying the heights of the selected objects 8A-8C is different in comparison with a case where the font size is set to be "fixed" (see FIG. 6).

The CPU 51 extracts all the selected characters from those included in the records 71-73 of the database file 7 indicted within the second image 572. Then, the CPU 51 further extracts a selected characters of which height is the greatest when they would be printed at the maximum font size of "16px" set in the setting section 57B. The CPU 51 sets the height of the selected characters which would be printed at the maximum font size of "16px" as the height of the selected characters. It is noted that a method of identifying the width of the selected objects is the same as in a case where the font size is set to be "fixed" in the setting section 57B (see FIG. 6).

Next, a method of determining the size of the selected object will be described using a case where the field 7C (REMARKS) is selected as the selected field as an example. In this case, firstly, the characters "SSSS(feed code)SSSS (feed code)SS", "TTTTTTTTT", which correspond to the field 7C, are extracted as the selected characters. As mentioned above, when the characters "SSSS(feed code)SSSS (feed code)SS", of which the number of characters in the height direction is the greatest, would be printed at the maximum font size "16px", the height thereof would be the highest. Thus, the CPU 51 determines the height of the characters "SSSS(feed code)SSSS(feed code)SS" when they would be printed at the maximum font size "16px" as the height of the selected objects. Methods of identifying a length in the width direction of the selected object 8C and the sizes of the selected objects 8A and 8B will not be described in detail.

As shown in FIG. 4, the CPU 51 displays the frame lines, which are dotted lines, indicating the selected objects within the layout area defined by the first image 571 based on the positions of the centers of the selected objects identified in S29 (see FIG. 3) and the sizes of the selected objects determined in S41 (S43). Next, the CPU 51 selects the selected characters to be arranged in the selected objects in accordance with the settings in the setting sections 57B and 57C (see FIGS. 6 and 7) (S45). A method of selecting the selected characters will be described later. Then, the CPU 51 determines the font size when the selected characters selected in S45 are arranged in the dotted-line frames indicating the selected objects displayed in S43 based on the settings in the setting sections 57B and 57C (S47). A method of determining the font size will be described later.

The CPU 51 displays the selected characters selected in S45 by the font size determined in S47 within the dotted-line frames corresponding to the selected objects displayed in S43 (S49). Thereafter, the CPU 51 forwards the process to S51.

Figure 8:
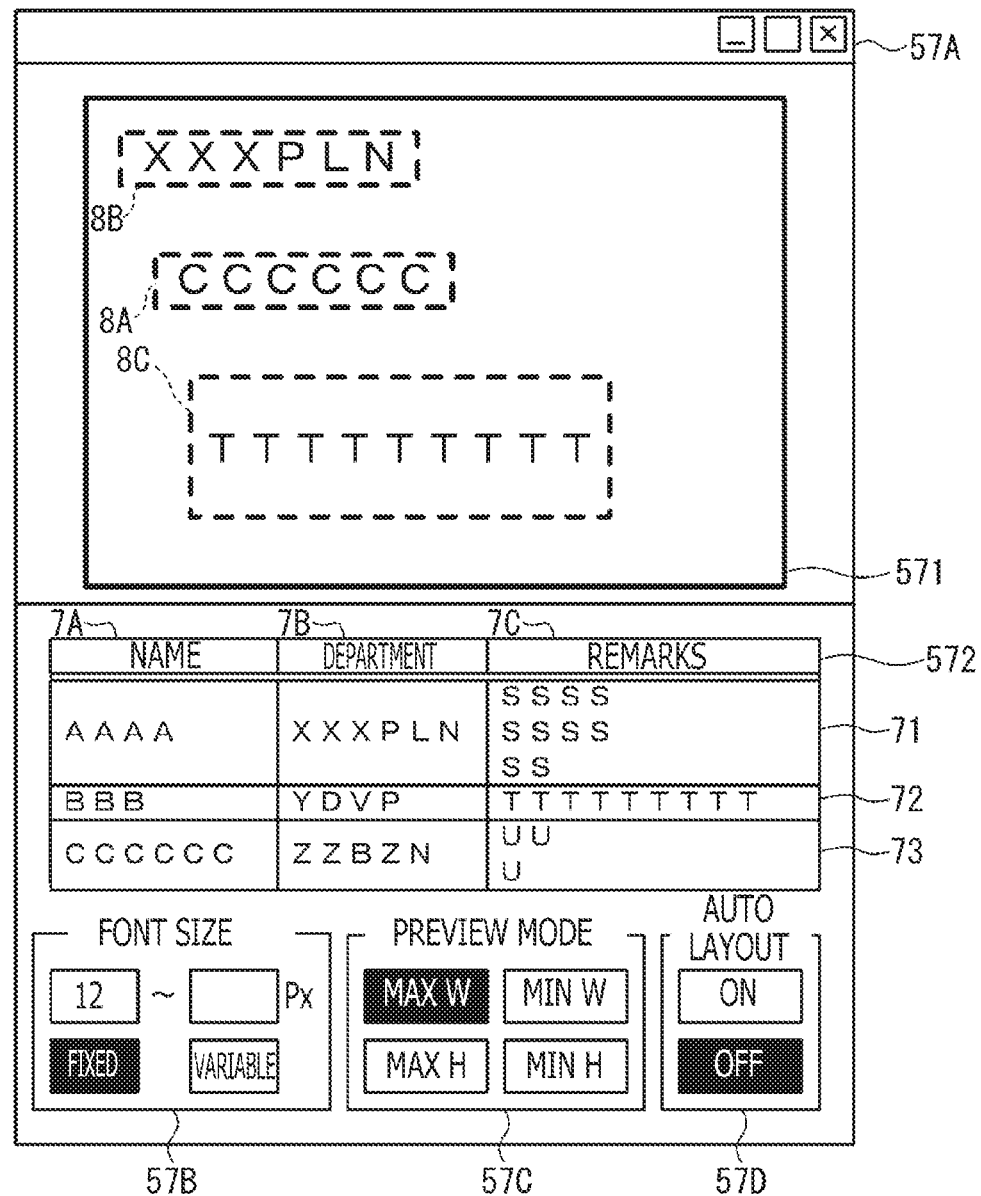
FIG. 8 shows a case where selected objects and selected characters are displayed.

Steps S45, S47 and S49 will be described in detail referring to a concrete example. In the following concrete example, it is assumed that, as shown in FIG. 8, in the setting section 57B, the minimum font size is set to "12px" and the font size is set to be "fixed". Further, in the setting section 57C, the review mode is set to "MAX W" (maximum width). In this case, the positions of the centers and sizes of the selected objects 8A, 8B and 8C are identified as indicated in FIG. 6 (S29, S41 and S43).

The CPU 51 selects, from among multiple selected characters corresponding to the selected fields of the database file 7 (see FIG. 1), selected characters of which width is the greatest when displayed at the minimum font size (S45). For example, when the selected field 7A is selected, the selected characters "CCCCCC" having the greatest number of characters in the width direction among the selected characters "AAAA", "BBB" and "CCCCCC" corresponding to the selected field 7A is selected as the selected characters of which width is the widest when indicated at the minimum font size (S45). Similarly, when the selected field 7B or 7C is selected, one of the selected characters corresponding to the selected field and having the greatest number of characters in the width direction (i.e., "XXXPLN", "TTTTTTTTT") is selected as the selected characters having the widest width when indicated at the minimum font size.

The CPU 51 sets the font size when the selected characters selected in S45 are displayed within the selected objects to the minimum font size of "12px" in accordance with the setting in the setting section 57B. When the selected field 7A is selected, the CPU 51 displays the selected characters "CCCCCC" by the font size of "12px" within the dotted-line frame of the corresponding selected object 8A (S49). Similarly, when the selected field 7B or 7C is selected, the CPU 51 displays the selected selection character "XXXPLN" or "TTTTTTTTT" by the font size of "12px" within the dotted-line frame of the corresponding selected objects 8B or 8C (S49). In this case, the selected characters "CCCCCC", "XXXPLN" or "TTTTTTTTT" are properly distributed within the corresponding selected objects 8A, 8B or 8C in the width direction.

In the above example, if the preview mode "MIN W" (minimum width) is set in the setting section 57C instead of "MAX W", the CPU 51 selects the selected characters which would have the smallest width (i.e., the smallest number of characters in the width direction) when the characters would be indicated at the minimum font size from among the multiple selected characters corresponding to the selected field of the database file 7 (see FIG. 1) in S45. Alternatively, if the preview mode "MAX H" (maximum height) is set in the setting section 57C instead of "MAX W", the CPU 51 selects the selected characters which would have the highest height (i.e., the greatest number of characters in the height direction) when the characters would be indicated at the minimum font size from among the multiple selected characters corresponding to the selected field of the database file 7 (see FIG. 1) in S45. Further alternatively, if the preview mode "MIN H" (minimum height) is set in the setting section 57C instead of "MAX W", the CPU 51 selects the selected characters which would have the smallest height (i.e., the smallest number of characters in the height direction) when the characters would be indicated at the minimum font size from among the multiple selected characters corresponding to the selected field of the database file 7 (see FIG. 1) in S45.

Then, the CPU 51 determines that the font size of the selected characters as selected is the minimum font size of "12px" in accordance with the setting in the setting section 57B (S47). Then, the CPU 51 displays the selected characters as selected by the font size of "12px" within the dotted-line frame indicating the corresponding selection field (S49).

Figure 9:
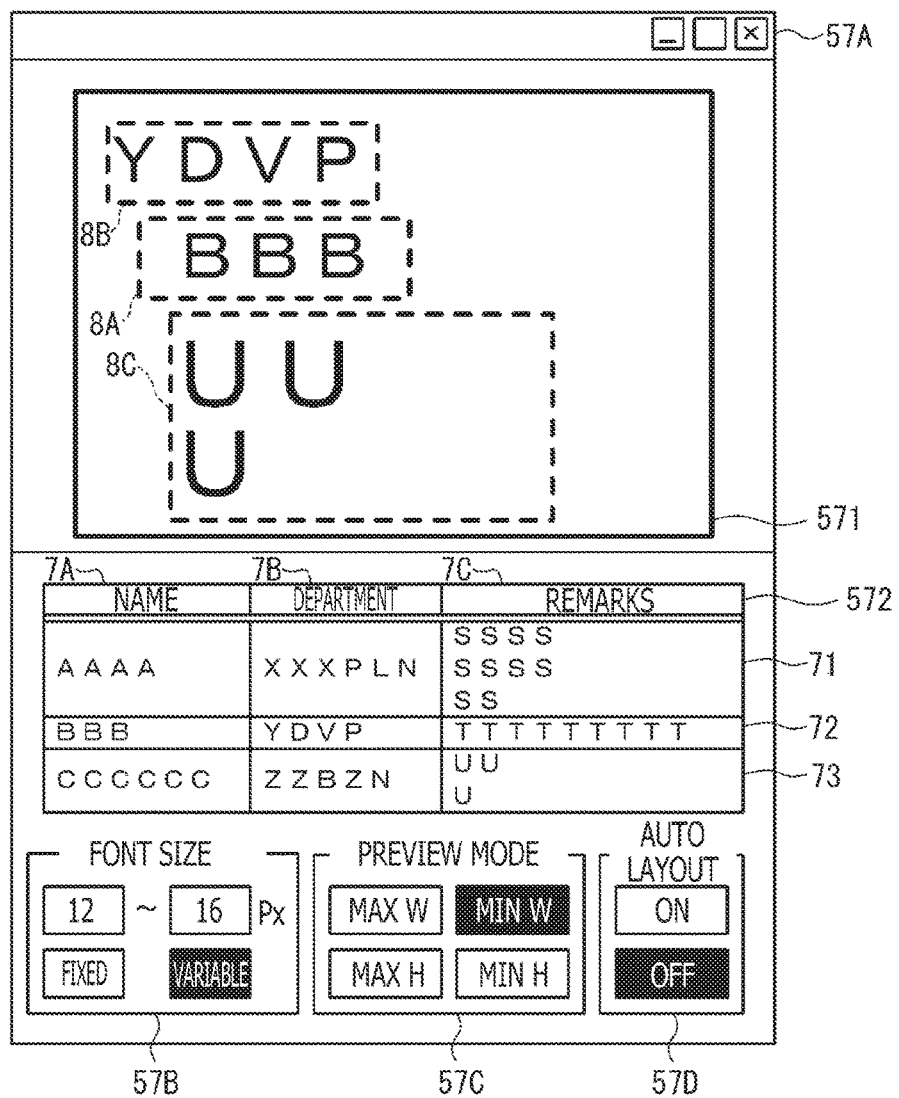
FIG. 9 shows another case where selected objects and selected characters are displayed.

Next, an example, as shown in FIG. 9, in which the minimum font size is set to "12px", the maximum font size is "16px" and the font size is set to be "VARIABLE" in the setting section 57B, and the preview mode is set to "MIN W" (i e, minimum width) in the setting section 57C will be described. In this case, the positions of the centers and the sizes of the selected objects 8A, 8B and 8C are identified as shown in FIG. 7 (S29, S41, S43).

The CPU 51 selects the selected characters of which width is smallest when indicated at the minimum font size from among the multiple selected characters corresponding to the selection fields of the database file 7 (see FIG. 7) (S45). For example, when the selection field 7A is selected, the selection character "BBB", the number of characters of which in the width direction is the smallest, is selected as the selected characters of which width is the smallest when indicated at the minimum font size, from among the selected characters "AAAA", "BBB" and "CCCCCC" corresponding to the selection field 7A. Similarly, when the selected field 7B or 7C is selected, the selected characters, the number of which in the width direction is the smallest (i.e., "YDVP" or "UU(feed code)U" will be selected as the selected characters of which width is the smallest when indicated at the minimum font size.

The CPU 51 determines the maximum font size within a range between the minimum font size "12px" and the maximum font size "16px" set in the setting section 57B such that the selected characters selected in S45 can be displayed within the selected object (S47).

As a concrete example, a case where the selected characters "BBB" of the selected field 7A is selected will be described. In this case, the CPU 51 gradually increases the font size from the minimum font size "12px" to a greater size with arranging the selected characters "BBB" within the selected object 8A which corresponds to the selected field 7A. It is assumed that the height of the selected characters "BBB" is higher than the height of the selected object 8A when the font size is greater than a particular size (e.g., "14px"). It is noted that the font size "14px" is within the range from the minimum font size "12px" to the maximum font size "16px". Then, the CPU 51 determines that the font size "14px" is the font size of the selected characters "BBB" (S47).

As an another example, a case where the selected characters "UU(feed code)U" of the selected field 7C is selected will be described. In this case, the CPU 51 gradually increases the font size from the minimum font size "12px" to a greater size with arranging the selected characters "UU(feed code)U" within the selected object 8C which corresponds to the selected field 7C. It is assumed that the height of the selected characters "UU(feed code)U" is included within the selected object 8C even when the font size is increased to "16px". Then, the CPU 51 determines that the font size "16px" is the font size of the selected characters "UU(feed code)U" (S47).

The CPU 51 indicates the selected characters "BBB", "YDVP" and "UU(feed code)U" as selected by the font sizes determined in S47, and displays the same within the dotted lines indicating the selected objects 8A, 8B and 8C, respectively.

As shown in FIG. 4, the CPU 51 determines whether an operation to instruct generation of the print layout file 8 is detected through the input device 56 (S51). When it is determined that the operation to generate the print layout file 8 is detected (S51: YES), the CPU 51 forwards the process to S53. In S53, the CPU 51 generates a print layout file 8 including information in which the selected objects of which central positions are identified in S29 (see FIG. 3) and the sizes are identified in S41 are associated with the selected fields. Then, the CPU 51 terminates the main process.

When it is determined that the operation to instruct generation of the print layout file 8 is not detected (S51: NO), the CPU 51 returns the process to S15 (see FIG. 3). As shown in FIG. 3, the CPU 51 repeatedly determines whether any one of the fields in the second image 572 is selected (S15).

As above, there could be a case where the multiple fields in the second image 572 are selected by a plurality of times of operations while one field at a time, until the operation to instruct generation of the print layout file is detected (S53: YES). In such a case, every time the one of the multiple fields is selected, the CPU 51 identifies the position of the center and the size of the corresponding selected object. Then, in the print layout file which is ultimately generated in S53, information in which the selected objects of which central positions and the sizes are identified are associated with the selected fields, respectively, are included by the number of pieces corresponding to the number of selections of the selected fields. Hereinafter, the number of selections the selected fields from the second image 572 one by one will be expressed by "n" (n being an integer).

When the "ON" button in the setting section 57D (see FIG. 6) is depressed, the CPU 51 determines that the auto layout mode is enabled as shown in FIG. 3 (S25: YES). In this case, the CPU 51 forwards the process to S27. In S27, the CPU 51 identifies respective positions of the n selected objects as described below based on the number n of selections of the selected field (S27). After execution of S27, the CPU 51 forwards the process to S41 (see FIG. 4). It is noted that process S41-S53 are the same as the process when the auto layout mode is disabled.

Next, a case where the selected field 7A is selected by a first dragging operation (n=1) (S15: YES, S17: NO), and a position corresponding to the selected field 7A is selected with a dropping operation (S23: YES) will be described. It is assumed that the minimum font size is set to "12px", the maximum font size is set to "16px", and the font size is selected to be "VARIABLE" in the setting section 57B, the preview mode of "MAX W" (maximum width) is set in the setting section 57C, and the auto layout mode is enables in the setting section 57D (S25: YES). In this case, the CPU 51 identifies the central position of the selected object 8A corresponding to the selected field 7A as the central position of the layout area indicated by the first image 571 (S27).

Regarding the selected field 7A, the CPU 51 selects the selected characters "CCCCCC" of which width is the greatest when indicated by the font size of "12px". Then, the CPU 51 identifies the size of the selected object 8A as the size of the layout area (S41). The CPU 51 displays dotted lines indicating the frame of the selected object 8A (S43). Then, the CPU 51 determines the selected characters "CCCCCC" as the characters arranged within the selected object 8A (S45). Next, the CPU 51 gradually increase the font size of the selected characters "CCCCCC" from the minimum font size "12px" to upper sizes with the selected characters "CCCCCC" being displayed at the minimum font size "12px" within the selected object 8A corresponding to the selected field 7A. It is assumed that, when the font size is increased to a size greater than a particular size (e.g., "15px"), the width of the selection character "CCCCCC" is greater than the selected object 8A. It is noted that the font size "15px" is within the range from the minimum font size of "12px" to the maximum font size of "16px" which is set in the setting section 57B. Therefore, the CPU 51 determines the font size of "15px" as the font size of the selected characters "CCCCCC" (S47). Then, the CPU 51 displays the selected characters "CCCCCC" within the frame indicated with the dotted lines representing the selected object 8A (S49).

Next, a case where the selected field 7B is selected at a second dragging operation (n=2) (S15: YES, S17: NO), and a position corresponding to the selected field 7B is selected with a dropping operation (S23: YES, S25: YES) will be described. In this case, the CPU 51 identifies the central position of the selected object 8B corresponding to the selected field 7B, which is selected at the second time, as described below (S27).

The CPU 51 identifies a position selected by the second dropping operation with respect to the central position of the selected field 7A which is identified by the first dropping operation as one of upside, down side, right side and left side. Specifically, the CPU 51 divides a displacement from the central position of the selected field 7A identified by the first dropping operation to the position selected by the second dropping operation into four directions (i.e., up, down, right and left directions), and identifies displacement amounts in respective directions. If the displacement on the up side is the greatest, the CPU 51 identifies that the position selected by the second dropping operation is on the upside. If the displacement on the down side is the greatest, the CPU 51 identifies that the position selected by the second dropping operation is on the down side. If the displacement on the right side is the greatest, the CPU 51 identifies that the position selected by the second dropping operation is on the right side. If the displacement on the left side is the greatest, the CPU 51 identifies that the position selected by the second dropping operation is on the left side.

Next, the CPU 51 identifies the central positions of the selected object 8A and the selected object 8B, respectively, so that the central position of the selected object 8B is arranged in the identified direction with respect to the central position of the selected object 8A. For example, in FIG. 10, the position selected by the second dropping operation is identified to be on the up side. In such a case, the central position of the selected object 8B is arranged on the up side with respect to the central position of the selected object 8A. Further, when the selected objects 8A and 8B are arranged based on the respective central positions, the central positions of the selected objects 8A and 8B are adjusted so that the layout area is divided into two equal parts in up-down direction by the selected objects 8A and 8B, respectively. Thus, the central position of the selected object 8A identified by the first dropping operation is changed.

Regarding the selected fields 7A and 7B, the CPU 51 selects the selected characters "CCCCCC" and "XXXPLN" of which widths, when indicated by the minimum font size "12px", are the greatest. The CPU 51 identifies the sizes of the selected objects 8A and 8B as the two equally divided layout area in the up-down direction, respectively (S41). With this configuration, the selected objects 8A and 8B do not overlap.

The CPU 51 displays the dotted lines indicating the selected objects 8A and 8B (S43). The CPU 51 determines the selected characters "CCCCCC" and "XXXPLN" to be arranged in the selected objects 8A and 8B (S45), and determines the font size to be "15px" as in the first time (S47). The CPU 51 displays the selected characters "CCCCCC" by arranging the same within the dotted line of the frame representing the selected object 8A, and the selected characters "XXXPLN" by arranging the same within the dotted line of the frame representing the selected object data 8B (S49).

As shown in FIG. 3, when it is determined that multiple fields are simultaneously selected as the selected fields by the dragging operation, the CPU 51 determines that a collective arrangement mode is selected (S17: YES). In this case, the CPU 51 forwards the process to S19. In the following description, a total number of selected fields, which are selected simultaneously, will be expressed by "m" (m being an integer more than one). Then, the CPU 51 determines whether any one of the layout areas indicated by the first image 571 is selected (S19). When it is determined that no dropping operations are detected (S19: NO), the CPU 51 returns the process to S19, and repeats the process of S23. When it is determined that a position is selected in accordance with a dropping operation (S19: YES), the CPU 51 forwards the process to S20.

Based on the arrangement table 6 (see FIG. 2), the CPU 51 selects one of the plurality of pieces of arrangement information 61-63 corresponding to the total number m of the selected fields simultaneously selected. The CPU displays a sub window capable of displaying the selected arrangement information on the generating window 57A in an overlapped manner. For example, when m=1, the CPU 51 displays a sub window through which the arrangement information 61 can be selected. When m=2, the CPU 51 displays a sub window through which one of the plurality of pieces of arrangement information 62A and 62B can be selected. When m=3, the CPU 51 displays a sub window through which one of the plurality of pieces of arrangement information 63A, 63B and 63C can be selected.

When an operation to select any one of items of the arrangement information displayed in the sub window, the CPU 51 obtains the selected arrangement information (S20). Then, based on the obtained arrangement information, the CPU 51 identifies the central positions of respective m selected fields as described below (S21). It is noted that, after execution of S21, the CPU 51 forwards the process to S41 (see FIG. 4). The process in S41-S45 is the same as the process when the auto layout mode is disabled.

It is noted that, in the above-described process, the CPU 51 may identify the position of the center of each of the m selected fields based on the arrangement set to be valid from among the arrangement information corresponding to the total number m of the arrangement tables 6. In such a case, the CPU 51 may not execute S51.

Figure 11:
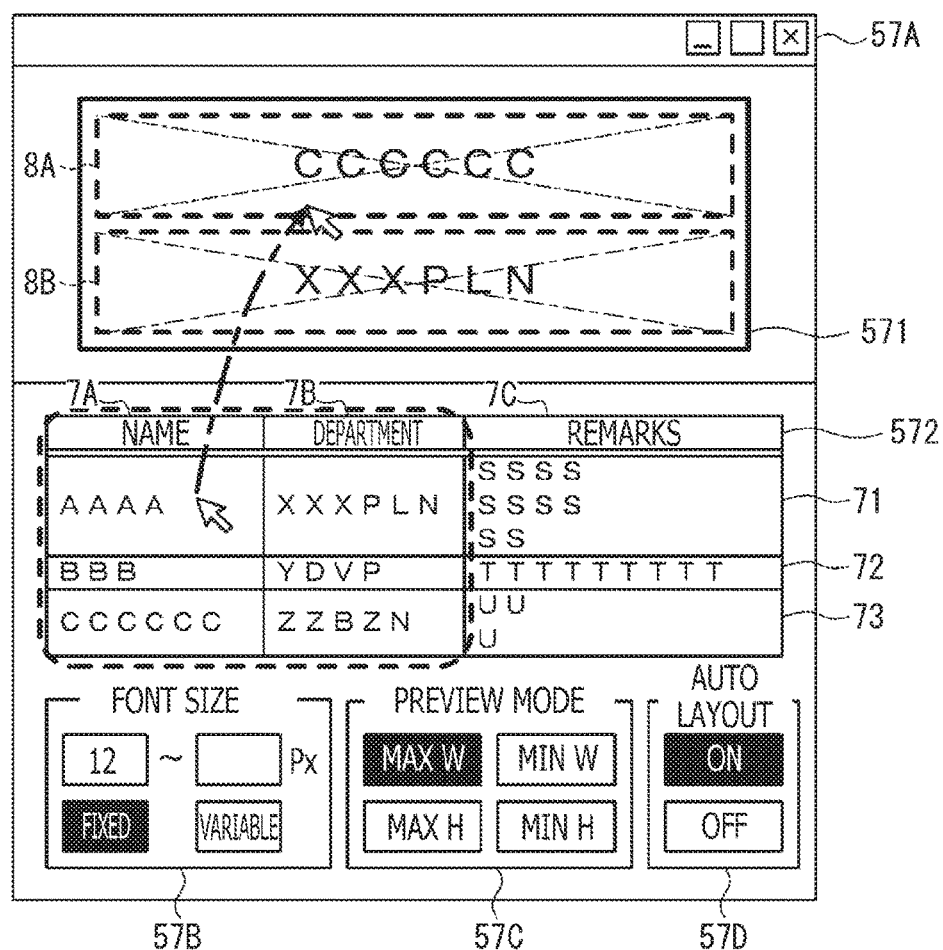
FIG. 11 shows a case where a dragging operation and a dropping operation are performed.

A case shown in FIG. 11, where the selected fields 7A and 7B are selected (i.e., m=2) by the dragging operation (S15: YES, S17: YES) and a position within the layout area is selected by the dropping operation (S19: YES) will be described. Further, a case where the arrangement information 62A (see FIG. 2) is selected after the dropping operation (S20) will be described. In the following description, it is assumed that the minimum font size "12px" and the "FIXED" font size are set in the setting section 57B, the preview mode is set to be "MAX W" (i.e., the maximum width) is set in the setting section 57C. In such a case, the CPU 51 identifies the positions of the centers of the selected object 8A corresponding to the selected field 7A and the selected object 8B of the selected field 7B based on the arrangement information 62A, which corresponds to a case where m=2, in the arrangement table 6 (see FIG. 2).

Specifically, the CPU 51 identifies the position of the center of the area 621 on the up side of arrangement information 61A as the position of the center of the selected object 8A corresponding to the selected field 7A arranged on the left side within the second image 572. Further, the CPU identifies the position of the center of the area 622 on the down side of the arrangement information 62A as the center of the selected object 8B which is arranged on the right side with respect to the selected object 8A within the second image 572. It is noted that the CPU 51 may identify the position of the center of the upper area 621 of the arrangement information 62A as the position of the center of the selected object 8B, and the position of the center of the lower area 622 of the arrangement information 62A as the position of the center of the selected object 8A.

The CPU 51 selects the selected characters of which width when indicated at the minimum font size "12px" are the largest ("CCCCCC", "XXXPLN") regarding the selected fields 7A and 7B, respectively. Then, the CPU 51 identifies the sizes of the selected objects 8A and 8B as the sizes of the corresponding areas 621 and 622, respectively (S41). Next, the CPU 51 displays the dotted lines indicating the frames of the selected objects 8A and 8B (S43). Then, the CPU 51 determines the selected characters "CCCCCC" and "XXXPLN" to be arranged within the selected objects 8A and 8B, respectively (S45), and determines the font sizes thereof as the minimum font size "12px" (S47). The CPU displays the selected characters "CCCCCC" within the frame 8A indicated by the dotted lines, and the selected characters "XXXPLN" within the frame 8B also indicated by the dotted lines (S49).

As shown in FIG. 3, when it is determined that no field in the second image 572 is selected by the dragging operation (S15: NO), the CPU 51 forwards the process to S61 (see FIG. 5). As shown in FIG. 5, the CPU 51 determines whether a frame, indicated by dotted lines, of the selected object included in the first image 571 is selected by the dragging operation (S61). When it is determined that no frame (indicated by dotted lines) representing a selected object is selected by the dragging operation (S61: NO), the CPU 51 returns the process to S15 (see FIG. 3). When it is determined that a frame (indicated by the dotted lines) representing a selected object is selected by the dragging operation (S61: YES), the CPU 51 forwards the process to S63.

In S63, the CPU 51 identifies the selected object corresponding to the frame selected by the dragging operation. The CPU 51 determines whether a position of the frame indicating a selected object is selected by the dropping operation (S65). When it is determined that the dropping operation is not detected (S65: NO), the CPU 51 returns the process to S65, and repeats S65. When it is determined that a position of the frame indicating a selected object is selected by the dropping operation (S65: YES), the CPU 51 forwards the process to S67. Then, the CPU 51 moves the frame indicating the selected object based on the position selected by the dropping operation (S67). Then, the CPU 51 forwards the process to S69.

Figure 12:
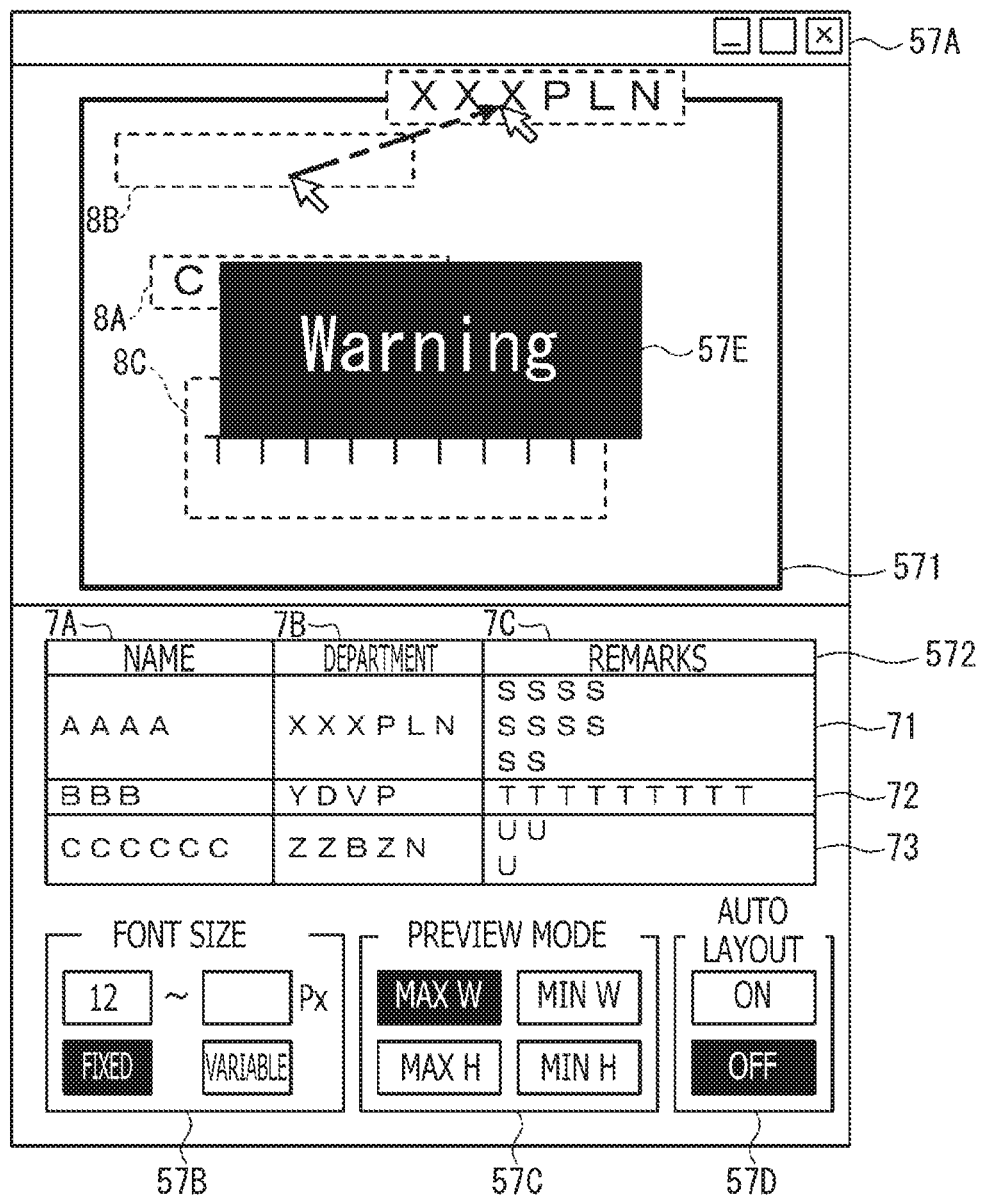
FIG. 12 shows a state where a sub window indicating "warning" is displayed.

In S69, the CPU 51 determines whether the frame indicating the selected object after movement can be included within the layout area represented by the first image 571. When it is determined that the frame after movement can be included within the layout area (S69: YES), the CPU 51 returns the process to S15 (see FIG. 3). When it is determined that at least a part of the frame after movement is arranged outside the layout area (S69: NO), the CPU 51 displays a sub window 57E in which a character string "Warning" is displayed in a highlighted manner so as to be overlaid on the first image 571 (see FIG. 12) to notify an occurrence of a warning state (S71). Thereafter, the CPU 51 returns the process to S15 (see FIG. 3).

As described above, the CPU 51 generates the print layout file in which the selected field selected by the dragging operation (S15) and the selected object of which position is identified by the dropping operation are associated with each other (S53). In this case, the printer 4 connected to the PC 5 through the cable 3 is capable of executing the layout printing process in which printing is executed with arranging the selected characters within the selected objects based on the print layout file for each record of the database file 7.

It is noted that the user is capable of causing the PC 5 to generate the print layout file in which the selected objects of which central positions are identified and the selected fields are associated with each other, by the dragging operation to select selected field based on the second image indicating the database file 7 and the dropping operations to select positions based on the first image 571 representing the layout area. According to the above configuration, the user operation process to generate the print layout file can be well suppressed, and the user can generate the print layout file easily.

The CPU 51 identifies the position, within the layout area represented by the first image 571, selected by the dropping operation directed to a selected field as the position of the center of the selected object corresponding to the selected field (S29). With this configuration, the user can easily generate the print layout file in which the selected objects are arranged at the positions selected by the dropping operations.

When multiple fields are simultaneously selected, by the dragging operation, as the selected fields (S17: YES), the CPU 51 identifies the respective positions of the multiple selected fields within the layout area based on the arrangement table 6 (S21). In this case, even if the user selects the positions minutely by the dropping operation, user can easily create a print layout file in which the multiple selected fields are arranged at positions according to the arrangement information 61, 62 and 63 of the arrangement table 6.

When the selected fields are selected, from the second image 572, one by one and n times, and the auto layout mode is enabled (S25: YES), the CPU 51 identifies the respective positions of the n selected fields as indicated below (S27). The CPU 51 identifies the position of the center of the selected field which is selected at n-th time based on the position selected by the dragging operation. Further, the CPU 51 changes the positions of the centers of the selected fields which are selected from first to (n−1)-th times so as not to overlap the position of the selected field at n-th time (S27). In this case, when the user performs an operation to select the multiple selected objects sequentially and one by one, the CPU 51 can change the layout in accordance with the number of the selected objects as selected so that the n selected objects do not overlap each other.

The CPU 51 identifies the size (i.e., the width and the height) of the selected object, of which central position is identified, as follows based on the setting of the font size in the setting section 57B. For example, when the minimum font is set in the setting section 57B and further the "FIXED" font size is selected, the CPU 51 extracts the selected characters of which width when indicated at the minimum font size set in the setting section 57B is the greatest, and identifies the width thereof (i.e., the width of the extracted selected characters indicated at the minimum font size) as the width of the selected object. Further, the CPU 51 extracts the selected characters of which height when indicated at the minimum font size set in the setting section 57B is the greatest, and identifies the height thereof (i.e., the height of the extracted selected characters indicated at the minimum font size) as the height of the selected object.

It is noted that the user is capable of causing the PC 5 to generate the print layout file in which the selected objects of which positions and sizes are identified and the selected fields are associated with each other, by the dragging operation to select selected fields based on the second image indicating the database file 7 and the dropping operations to select positions based on the first image 571 representing the layout area. Further, the selected characters of whichever record are arranged within the selected object, the CPU 51 is capable of suppress protrusion of the selected characters indicated at the minimum font size from the selected object in either the width or height direction.

When it is determined that at least a part of the frames representing the selected objects, which have been moved in accordance with the dragging and dropping operations, is arranged outside the layout area represented by the first image 571 (S69: YES), the CPU 51 displays a sub window 57E in which the character string "Warning" is indicated in highlighted manner (S71). It is noted that, when at least a part of the selected objects is arranged outside the layout area, there is a possibility that the printer 4 cannot execute the layout printing process appropriately based on the print layout file. Therefore, in such a case, the CPU 51 is configured to notify that an inappropriate print layout may be generated as at least a part of the selected objects is arranged outside the layout area by display the sub window 57E.

The CPU 51 displays (S49) the selected characters selected in S45 by the font size determined in S47 within the frame, indicated by the dotted lines, representing the selected object displayed in S43. According to such a configuration, the user can confirm a print image when the layout printing process is executed.

When the font size is set to be "FIXED" in the setting section 57B, the CPU 51 identifies the selected characters to be arranged within the selected fields and the font size of the selected characters (S45, S47 and S29). For example, when one of the "MAX W" (maximum width)/"MNI W" (minimum width)/"MAX H" (maximum height)/"MIN H" (minimum height) is set in the setting section 57C, the CPU 51 selects, from among the multiple selected characters corresponding to the selected field of the database file 7, the selected characters of which width is the greatest ("MAX W"), width is the smallest ("MIN W"), height is the greatest ("MAX H") or height is the smallest ("MIN H"), when indicated at the smallest font size (S45).

The CPU 51 determines the minimum font size input in the setting section 57B as the font size of the selected characters as selected (S47). Then, the CPU 51 arranges and displays the selected characters at the determined font size within the selected field (S49). Thus, the user can confirm the print image, when the layout printing process would be executed by the printer 4, of the selected characters of which width is the greatest, the selected characters of which width is the smallest, the selected characters of which height is the greatest, and the selected characters of which height is the smallest.

When the font size is set to be "VARIAVBLE" in the setting section 57B, the CPU 51 identifies the selected characters arranged within the selected field and the font size thereof as described below (S45, S47).

The CPU 51 selects the selected characters corresponding to the setting section 57C from among the multiple selected characters corresponding to the selected field of the database file 7 (see FIG. 1) (S45). Then, the CPU 51 determines the largest font size at which the selected characters as selected can be arranged within the selected object by varying the font size within the range of the minimum font size and the maximum font size set in the setting section 57 (S47). In this case, the user can confirm the print image, when the layout printing process would be executed by the printer 4, of a case where the selected characters are displayed at the largest possible font size at which the selected characters are confined within the selected objects.

<Modification>

Hereinafter, a modification of the above-described illustrative embodiment will be described. The modification is different from the illustrative embodiment described above in that, when the font size is set to be "VARIABLE" in the setting section 57B, the CPU 51 inserts the feed code into the characters, thereby arranging the selected characters within the selected field at a relatively large font size. In the following description, it is assumed that the minimum font size is set to "12px", the maximum font size is set to "16px", and the font size is set to be "VARIABLE" in the setting section 57B, the preview mode is set to "MAX W" (maximum width) in the setting section 57C, and the auto layout mode is enabled in the setting section 57D.

Figure 10:
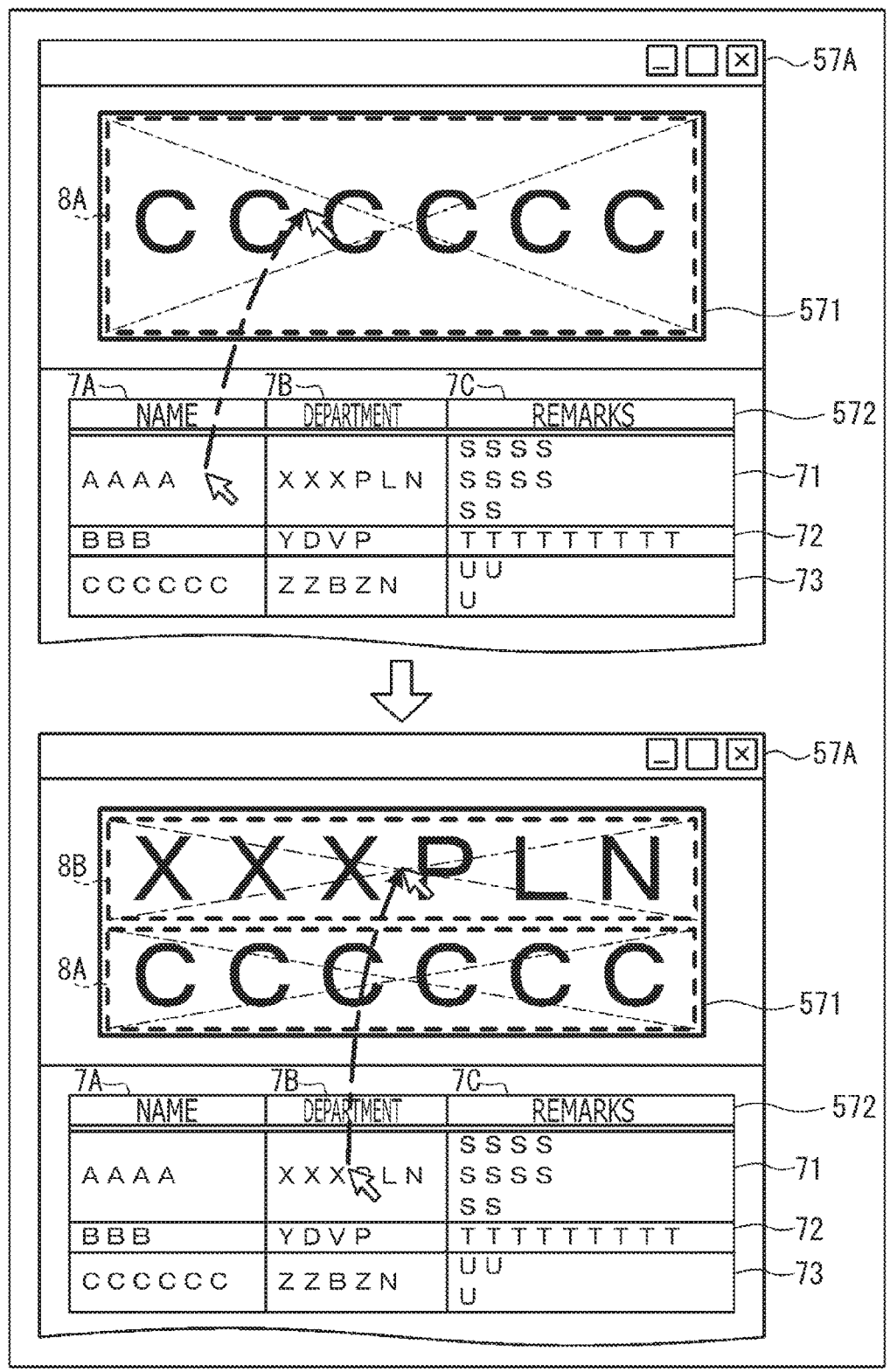
FIG. 10 shows a case where a dragging operation and a dropping operation are performed.
Figure 13:
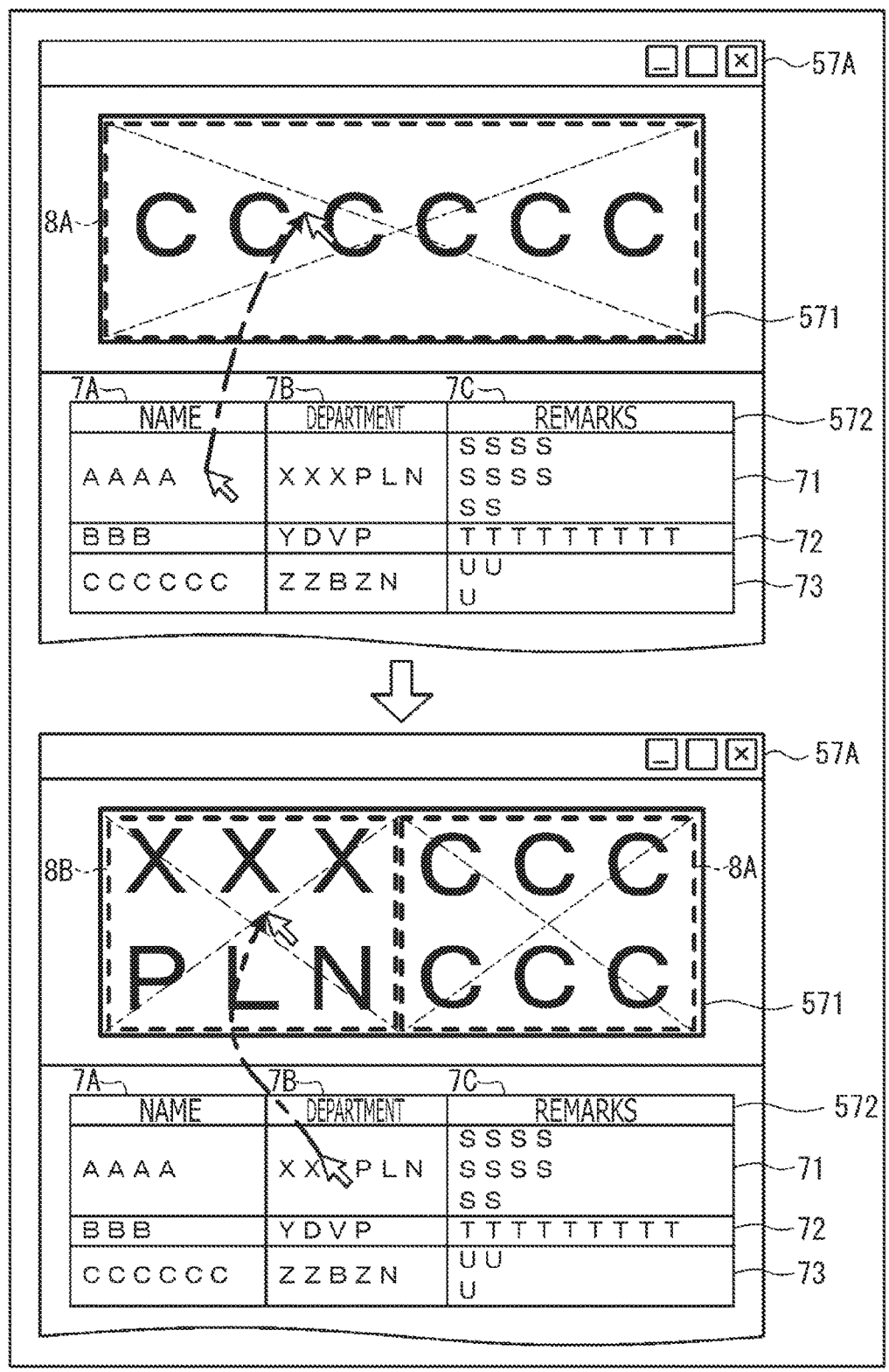
FIG. 13 shows a case where selected objects and selected characters are displayed according to a modified embodiment.

A case where, as shown in FIG. 13, the selection field 7A is selected by the first (n=1) dragging operation (S15: YES, S17: NO), and the position corresponding to the selected field 7A is selected by the dropping operation (S23: YES, S25: YES) will be described. In this case, the CPU 51 identifies the position of the center of the selected object 8A corresponding to the selected field 7A (S27). Thereafter, processes similar to those in FIG. 10 are executed (S41, S43, S45 and S47), and the selected characters "CCCCCC" are arranged within the frame indicated by the dotted lines and representing the selected object 8A (S49). It is noted that the font size of the selected characters "CCCCCC" is determined to be "15px" (S47).

Next, a case where the selection field 7B is selected by the second (n=2) dragging operation (S15: YES, S17: NO), and the position corresponding to the selected field 7B is selected by the dropping operation (S23: YES, S25: YES) will be described. The CPU 51 identifies the position selected by the second dropping operation, with respect to the position of the center of the selected field 7A identified by the first dropping operation, as one of the upside, downside, right side, and left side. Unlike a case shown in FIG. 10, it is assumed that, as shown in FIG. 13, the position selected by the second dropping operation is identified as the left side with respect to the position of the center of the selected field 7A which is identified by the first dropping operation. In this case, the CPU 51 arrange the position of the center of the selected object 8B on the left side with respect to the position of the center of the selected object 8A. When the selected objects 8A and 8B are arranged based on the central positions of the selected objects 8A and 8B, respectively, the CPU 51 adjusts the positions of the centers of the selected objects 8A and 8B so that the selected objects 8A and 8B divide the layout area into two equal parts in the right-left direction. As a result, the position of the center of the selected object 8A identified in the first dropping operation is changed.

The CPU 51 selects the selected characters "CCCCCC" and "XXXPLN" of which widths are greatest when indicated at the minimum font size "12px" for the selected fields 7A and 7B, respectively. Then, the CPU 51 identifies the sizes of the selected objects 8A and 8B so as to match the two equally divided parts of the layout area in the right-left direction, respectively (S41). As a result, the selected objects 8A and 8B do not overlap each other. The CPU 51 displays the frames indicating the selected objects 8A and 8B by the dotted lines (S43).

The CPU 51 determines the selected characters "CCCCCC" and "XXXPLN" as ones to be arranged within the selected objects 8A and 8B, respectively (S45). The CPU 51 firstly arranges the selected characters "CCCCCC" within the corresponding selected object 8A at the minimum font size "12px", and gradually increases the font size from "12px" to larger sizes.

In such a situation, it is assumed that, when the font size is greater than a particular font size (e.g., "13px"), the width of the selected characters "CCCCCC" becomes greater than the width of the selected object 8A. In such a case, the CPU 51 inserts the feed code at the center of the selected characters "CCCCCC" to modified selected characters "CCC(feed code)CCC".

Thereafter, the CPU 51 gradually enlarges the font size. It is assumed that the width of the selected characters "CCC(feed code)CCC" becomes greater than the width of the selected object 8A when the font size (e.g., "15px").

It is noted that the font size "15px" is within the range from the minimum font size "12px" to the maximum font size "16px". Thus the CPU 51 determines that the font size of the selected characters "CCC(feed code)CCC" is "15px" (S47). Then, the CPU 51 displays the selected characters "CCC(feed code)CCC" within the frame indicated by the dotted lines and representing the selected object 8A (S49). In a case where the font size when the selected characters "XXXPLN" is arranged in the selected object 8B, the substantially the same process is executed. As a result, the CPU 51 displays the selected characters "XXX(feed code) PLN" (by the font size "15px") within the frame representing the selected object 8B and indicated by the dotted lines (S49).

According to the configuration of the modification, by inserting the feed code in the selected characters to be arranged within the selected object, the font size of the selected characters can be enlarged relatively with maintaining a state that the selected characters are confined within the selected object. In this case, the user can confirm the print image in which the selected characters are confined within the selected object with the font size thereof maintained.

In the above-described modification, a position where the feed code is inserted in the characters need not be limited to a central position thereof. For example, a position where the feed code can be inserted may be set in advance for respective character strings. Further, the number of the feed codes to be inserted need not be limited to one, but more than one. Further, also in such a case, positions where the feed codes can be inserted may be set in advance for respective character strings.

<Further Modifications>

It is noted that the above-described configurations of the illustrative embodiment and its modification can be modified in various ways. For example, the main process described above may be executed by the CPU 41 of the printer 4. In such a case, the printer 4 may directly execute the template printing based on the print layout file selected by executing the main process and the database file 7.

According to the illustrative embodiment, the CPU 51 retrieves the tape information stored in the HDD 54, and identifies the layout frames corresponding to the retrieved tape width and tape type and displays the first image 571 (S11). This configuration may be modified such that the CPU 51 directly communicate with the printer 4 through the cable 3, and directly obtains the tape information from the printer 4. Further, the first image 571 need not be limited to indicate the layout frame, but may display a rectangle having a color different from the background. In such a case, an area inside the rectangle represents the layout area.

An operation to select any one of the fields within the second image 572 is not limited to the dragging operation. For example, the CPU 51 may set any one of the fields to an active state in accordance with an operation of a particular key of the input device 46. In such a case, when another particular key (e.g., a return key) is depressed, the CPU 51 may determine that the active field is selected. Further, in such a case, an operation to select a position corresponding to the selected field need not be limited to the dropping operation. For example, when a mouse pointer is located at a position within a layout area of the first image 571 and a particular key (e.g., the return key) of the input device 46 is depressed, the CPU 51 may determine that the position of the mouse pointer is selected as the position corresponding to the selected field.

According to the illustrative embodiment, the CPU 51 identifies the size of the selection in accordance with the setting states in the setting sections 57B and 57C (S41). This configuration may be modified such that the selected object always has a constant size (i.e., a constant width and a constant height). In such a case, the CPU 51 may generate the print layout file including information in which the selected objects of which central positions are identified in S29 and the selected fields are associated with each other in S53. In other words, the size of the selected objects may not be included in the print layout file. Further, when an operation to change the size of the selected object having the constant size is detected through the input device 46, the CPU 51 may change the size of the selected object in accordance with the detected operation.

According to the illustrative embodiment, when the minimum font size is set and the font size is set to be variable in the setting section 57B, the CPU 51 extracts the selection character of which width becomes the greatest when indicated at the minimum font size. Further, the CPU 51 identifies that the width of the extracted selected characters indicated at the minimum font size as the width of the selected object. Similarly, the CPU 51 extracts the selection character of which height becomes the greatest when indicated at the minimum font size. Further, the CPU 51 identifies that the height of the extracted selected characters indicated at the minimum font size as the height of the selected object. The above configuration may modified such that the CPU 51 may identify the width of the extracted selected characters indicated at the minimum font size added with a particular length as the width of the selected object. Similarly, the CPU 51 may identify the height of the extracted selected characters indicated at the minimum font size added with a particular length as the height of the selected object.

Figure 14:
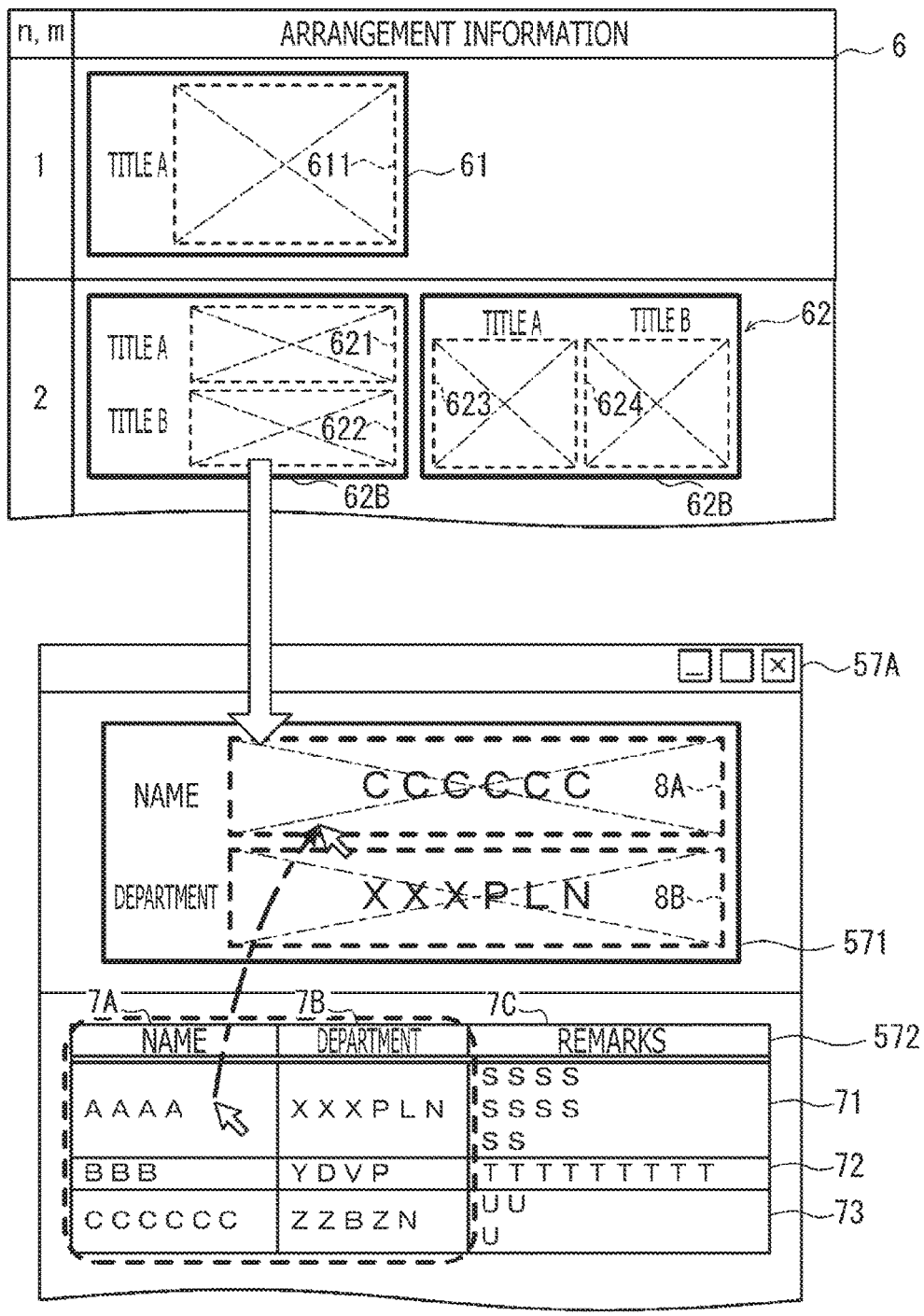
FIG. 14 shows an example of an arrangement table according to the modified embodiment.

After the CPU 51 displays frames representing the selected objects by dotted lines (S43), instead of displaying of the selected characters within the frames (S45, S47, S49), names of the corresponding selection field may be displayed within the frames. Further, as shown in the arrangement table 6 in FIG. 14, the arrangement information 61-63 may include areas indicating names of the corresponding selected fields in advance.

After the CPU 51 displays frames representing the selected objects by dotted lines (S43), in addition to displaying of the selected characters within the frames (S45, S47, S49), the names of the corresponding selection field may be displayed within the frames. Specifically, in FIG. 14, a portion of "TITLE A" indicated on the left side with respect to an area 621 in the arrangement information 61, the "NAME" of the selected field may be displayed, and a portion of "TITLE B" indicated on the left side with respect to an area 622 in the arrangement information, the "DEPARTMENT" of the selected field may be displayed in the first image 571.

The CPU 51 may determine the positions of the centers of the selected objects in accordance with the arrangement table 6 (see FIG. 2). As an example, a case where the selected field 7A is selected at the first (n=1) dragging operation (S15: YES, S17: NO) and a position corresponding to the selected field 7A is selected by the dropping operation (S23: YES) will be described. In this case, the CPU 51 identifies the position of the center of the selected object 8A corresponding to the selected field 7A in accordance with the arrangement information 61, which corresponds to a case where n=1, in the arrangement table 6 (S27). As shown in FIG. 2, the area 611 indicated by the arrangement information 61 covers an entire area of the layout area. Therefore, a position of the center of the selected object 8A can be identified as the position of the center of the area 611, or the center of the layout area.

As another example, a case where the selected field 7B is selected at the second (n=2) dragging operation (S15: YES, S17: NO) and a position corresponding to the selected field 7B is selected by the dropping operation (S23: YES, S25: YES) will be described. In this case, the CPU 51 identifies the position of the center of the selected object 8B corresponding to the selected field 7B in accordance with the arrangement information 62A, which corresponds to a case where n=2, in the arrangement table 6. Further, the CPU 51 identifies the position of the center of the selected object 8A corresponding to the selected field 7A which is selected at the first dragging operation in accordance with the arrangement information 62A (S27).

Specifically, from two areas 621 and 622 indicated by the arrangement information 62A, the CPU 51 identifies the upper area 621 which includes the position selected by the second dropping operation. Then, the CPU 51 identifies the position of the center of the upper area 621 as identified as the position of the center of the selected object 8B corresponding to the selected field 7B (S27). Further, the CPU 51 changes the position of the center of the selected object 8A such that, the position of the center of the lower area 622, between the areas 621 and 622, matches the position of the center of the selected object 8A corresponding to the selected field 7A which is selected at the first dropping operation. With the above configuration, the position of the center of the selected object 8A can be identified (S27). It is noted that positions of the centers and the sizes of the areas 621 and 622 are adjusted so that the areas 621 and 622 do not overlap each other. The sizes of the selected objects 8A and 8B are identified so that they do not overlap each other.

It is noted that, in the above-described configurations, various types of information equipment such as a smartphone, a tablet PC or the like may be used instead of the PC 5. Further, in the above-described configurations, the printer 4 need not be limited to the tape printer, but could be various types of well-known printers such as an MFP (multi-function peripheral), inkjet printer and the like.

What is claimed is:

1. A non-transitory storage medium storing computer-readable instructions to generate print layout data,
   wherein the instructions, when executed by a controller of a print layout generating device, cause the print layout generating device to:
   display, in an interface, a first image indicative of a layout area in which objects can be arranged, each of the objects indicating an area within which characters are arranged;
   display, in the interface, a second image simultaneously with the display of the first image, the second image indicative of a database including a plurality of fields, and at least one record for each of the plurality of fields, the at least one record containing character data corresponding to each of the plurality of fields, the character data indicating characters;
   receive a first operation to select at least one field of the plurality of fields based on the second image;
   receive a second operation to select a position within the layout area based on the first image;
   determine a number of fields in the at least one field;
   acquire arrangement information based on the determined number of fields in the at least one field, the arrangement information including at least one object of which a number is the same as the number of fields in the at least one field, the arrangement information indicating a layout of the at least one object within the layout area;
   identify a position of the at least one object within the layout area based on the arrangement information;
   generate the print layout data in which the at least one object, of which the position is identified, and the at least one field selected from the database by the first operation are associated with each other,
   wherein the characters of the at least one field are arranged within the at least one object corresponding to the at least one field.

2. The non-transitory computer-readable storage medium according to claim 1,
   wherein the instructions further cause the controller to identify the position, within the layout area, selected by the second operation as the position of the at least one object.

3. The non-transitory computer-readable storage medium according to claim 1,
   wherein the instructions further cause the controller to identify the position of the at least one object based on the arrangement information when the selected at least one field includes multiple fields simultaneously selected by the first operation.

4. The non-transitory computer-readable storage medium according to claim 1,
   wherein, when the at least one object is selected at an n-th (n being an integer more than one) second operation, the instructions further cause the controller to:
   identify a position of the at least one object which is selected at the n-th second operation based on a position selected by the n-th second operation; and
   identify one or more positions of one or more objects which are selected at first through (n−1)-th second operations so as not to overlap the at least one object selected by the n-th second operation.

5. The non-transitory computer-readable storage medium according to claim 1,
   wherein the instructions further cause the controller to:
   identify a size of the at least one object; and
   generate the print layout data in which the identified position and the identified size of the at least one object are associated with the selected at least one field.

6. The non-transitory computer-readable storage medium according to claim 5,
   wherein the instructions further cause the controller to:
   identify a width of the at least one object based on a greatest width of the characters of the at least one field associated with the at least one object, the greatest width being determined based on a particular font size.

7. The non-transitory computer-readable storage medium according to claim 5,
   wherein the instructions further cause the controller to:
   identify a height of the at least one object based on a greatest height of the characters of the at least one field associated with the at least one object, the greatest height being determined based on a particular font size among at least one record.

8. The non-transitory computer-readable storage medium according to claim 1,
   wherein the instructions further cause the controller to:
   receive a third operation to move the at least one object; and
   output a notification indicating that at least a part of the at least one object subject to the third operation protrudes outside the layout area when moved.

9. The non-transitory computer-readable storage medium according to claim 1,
   wherein the instructions further cause the controller to display the characters of the at least one field in association with the at least one object which is arranged within the layout area.

10. The non-transitory computer-readable storage medium according to claim 1,
wherein the instructions further cause the controller to:
display the characters having a greatest width or a smallest width, among at least one record, when indicated by a particular font size, in association with the at least one object corresponding to the characters.

11. The non-transitory computer-readable storage medium according to claim 1,
wherein the instructions further cause the controller to:
display the characters having a greatest height or a smallest height, among at least one record, when indicated by a particular font size, in association with the at least one object corresponding to the characters.

12. The non-transitory computer-readable storage medium according to claim 10,
wherein the instructions further cause the controller to change a font size of the characters so that the characters fit entirely within the at least one object corresponding to the characters.

13. The non-transitory computer-readable storage medium according to claim 11,
wherein the instructions further cause the controller to change a font size of the selected characters so that the characters fit entirely within the at least one object corresponding to the characters.

14. The non-transitory computer-readable storage medium according to claim 9,
wherein the instructions further cause the controller to insert at least one feed code among the characters so that the characters fit entirely within the at least one object corresponding to the characters.

15. The non-transitory computer-readable storage medium according to claim 1, wherein the first operation is a dragging operation, and
wherein the second operation is a dropping operation.

16. The non-transitory computer-readable storage medium according to claim 1, wherein the instructions further cause the print layout generating device to display, in the interface, a sub window including at least one piece of the arrangement information to be selected.

17. The non-transitory computer-readable storage medium according to claim 16, wherein the instructions further cause the print layout generating device to receive a selecting operation to select one of the at least one piece of the arrangement information displayed on the sub window.

18. A print layout generating device configured to generate print layout data, comprising:
an input device;
a display device; and
a controller,
wherein the controller is configured to:
display a first image in an interface on the display device, the first image being indicative of a layout area in which objects can be arranged, each of the objects indicating an area within which characters are arranged;
display a second image in the interface on the display device simultaneously with the display of the first image, the second image being indicative of a database including a plurality of fields, and at least one record for each of the plurality of fields, the at least one record containing character data corresponding to each of the plurality of fields, the character data indicating characters;
receive, through the input device, a first operation to select at least one field of the plurality of fields based on the second image;
receive a second operation to select a position within the layout area based on the first image through the input device;
determine a number of fields in the at least one field;
acquire arrangement information based on the determined number of fields in the at least one field, the arrangement information including at least one object of which a number is the same as the number of fields in the at least one field, the arrangement information indicating a layout of the at least one object within the layout area;
identify a position of the at least one object within the layout area based on the arrangement information;
generate the print layout data in which the at least one object, of which the position is identified, and the at least one field selected from the database by the first operation are associated with each other,
wherein the characters of the at least one field are arranged within the at least one object corresponding to the at least one field.

19. The print layout generating device according to claim 18, wherein the controller is further configured to display, in the interface, a sub window including at least one piece of the arrangement information to be selected.

20. The print layout generating device according to claim 19, wherein the controller is further configured to receive a selecting operation to select one of the at least one piece of the arrangement information displayed on the sub window.

* * * * *